United States Patent
Kulas et al.

(10) Patent No.: US 8,246,183 B2
(45) Date of Patent: Aug. 21, 2012

(54) INTERIOR REARVIEW MIRROR ASSEMBLY

(75) Inventors: Jerry M. Kulas, Holland, MI (US); Lee Karner, Holland, MI (US); Dean Andreozzi, Grand Haven, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 13/162,216

(22) Filed: Jun. 16, 2011

(65) Prior Publication Data

US 2011/0242667 A1 Oct. 6, 2011

Related U.S. Application Data

(60) Continuation of application No. 12/534,544, filed on Aug. 3, 2009, now abandoned, which is a continuation of application No. 11/828,192, filed on Jul. 25, 2007, now Pat. No. 7,568,810, which is a division of application No. 10/933,842, filed on Sep. 3, 2004, now Pat. No. 7,249,860.

(60) Provisional application No. 60/500,858, filed on Sep. 5, 2003.

(51) Int. Cl.
*G02B 5/08* (2006.01)
*G02B 7/182* (2006.01)
*G08B 5/00* (2006.01)
*B60R 1/04* (2006.01)

(52) U.S. Cl. ..... 359/604; 359/839; 359/872; 340/815.4; 340/525

(58) Field of Classification Search .......... 359/604, 359/839, 872; 340/525, 815.4
See application file for complete search history.

(56) References Cited

U.S. PATENT DOCUMENTS

| | | | |
|---|---|---|---|
| 3,680,951 A | 8/1972 | Jordan et al. | |
| 3,870,404 A | 3/1975 | Wilson et al. | |
| 4,266,856 A | 5/1981 | Wainwright | |
| 4,435,042 A | 3/1984 | Wood et al. | |
| 4,443,057 A | 4/1984 | Bauer et al. | |
| 4,679,906 A | 7/1987 | Brandenburg | |
| 4,701,022 A | 10/1987 | Jacob | |
| 4,733,336 A | 3/1988 | Skogler et al. | |
| 4,807,096 A | 2/1989 | Skogler et al. | |
| 4,809,425 A | 3/1989 | Monforte | |
| 4,826,289 A | 5/1989 | Vandenbrink et al. | |
| 4,882,565 A | 11/1989 | Gallmeyer | |
| 4,930,742 A | 6/1990 | Schofield et al. | |
| 4,936,533 A | 6/1990 | Adams et al. | |
| 5,100,095 A | 3/1992 | Haan et al. | |
| 5,205,639 A | 4/1993 | White et al. | |
| 5,207,501 A | 5/1993 | Sakuma et al. | |
| 5,327,288 A | 7/1994 | Wellington et al. | |
| 5,475,366 A * | 12/1995 | Van Lente et al. | 340/525 |

(Continued)

*Primary Examiner* — Ricky D Shafer
(74) *Attorney, Agent, or Firm* — Gardner, Linn, Burkhart & Flory, LLP

(57) ABSTRACT

An interior rearview mirror assembly for a vehicle includes a prismatic reflective element with an attachment plate attached thereto, and a display-on-demand display disposed behind the prismatic reflective element and operable to display information for viewing through a transflective mirror reflector of the prismatic reflective element by a driver of the vehicle. A mounting assembly is configured to mount the mirror assembly to an interior portion of the vehicle. The mounting assembly includes a toggle portion and an actuator, with the toggle portion pivotally mounting to a first mounting member and the actuator pivotally mounting to a second mounting member of the attachment plate. An electronic circuitry element is attached to the attachment plate and an accessory pod is attached to the mounting assembly and includes circuitry therein. The circuitry of the accessory pod is electrically connected to the electronic circuitry element.

19 Claims, 26 Drawing Sheets

U.S. PATENT DOCUMENTS

| | | | |
|---|---|---|---|
| 5,521,760 A | 5/1996 | De Young et al. | |
| 5,550,677 A | 8/1996 | Schofield et al. | |
| 5,572,354 A | 11/1996 | Desmond et al. | |
| 5,576,687 A | 11/1996 | Blank et al. | |
| 5,594,222 A | 1/1997 | Caldwell | |
| 5,631,638 A | 5/1997 | Kaspar et al. | |
| 5,649,756 A | 7/1997 | Adams et al. | |
| 5,661,455 A | 8/1997 | Van Lente et al. | |
| 5,668,663 A | 9/1997 | Varaprasad et al. | |
| 5,671,996 A * | 9/1997 | Bos et al. | 362/488 |
| 5,673,994 A | 10/1997 | Fant, Jr. et al. | |
| 5,708,410 A | 1/1998 | Blank et al. | |
| 5,724,187 A | 3/1998 | Varaprasad et al. | |
| 5,796,094 A | 8/1998 | Schofield et al. | |
| 5,798,688 A | 8/1998 | Schofield | |
| 5,820,097 A | 10/1998 | Spooner | |
| 5,820,245 A | 10/1998 | Desmond et al. | |
| 5,877,897 A | 3/1999 | Schofield et al. | |
| 5,878,353 A | 3/1999 | Ul Azam et al. | |
| 5,940,503 A | 8/1999 | Palett et al. | |
| 5,971,553 A | 10/1999 | Durnwald | |
| 6,000,823 A | 12/1999 | Desmond et al. | |
| 6,001,486 A | 12/1999 | Varaprasad et al. | |
| 6,087,953 A * | 7/2000 | DeLine et al. | 340/815.4 |
| 6,097,023 A | 8/2000 | Schofield et al. | |
| 6,124,886 A | 9/2000 | DeLine et al. | |
| 6,170,956 B1 | 1/2001 | Rumsey et al. | |
| 6,170,957 B1 | 1/2001 | Kaspar | |
| 6,239,899 B1 | 5/2001 | DeVries et al. | |
| 6,243,003 B1 | 6/2001 | DeLine et al. | |
| 6,278,377 B1 | 8/2001 | DeLine et al. | |
| 6,310,611 B1 | 10/2001 | Caldwell | |
| 6,313,454 B1 | 11/2001 | Bos et al. | |
| 6,318,870 B1 | 11/2001 | Spooner et al. | |
| 6,320,176 B1 | 11/2001 | Schofield et al. | |
| 6,320,282 B1 | 11/2001 | Caldwell | |
| 6,326,900 B2 | 12/2001 | DeLine et al. | |
| 6,329,925 B1 | 12/2001 | Skiver et al. | |
| 6,353,392 B1 | 3/2002 | Schofield et al. | |
| 6,386,742 B1 | 5/2002 | DeLine et al. | |
| 6,420,975 B1 | 7/2002 | DeLine et al. | |
| 6,520,667 B1 | 2/2003 | Mousseau | |
| 6,572,233 B1 | 6/2003 | Northman et al. | |
| 6,627,918 B2 | 9/2003 | Getz et al. | |
| 6,648,477 B2 | 11/2003 | Hutzel et al. | |
| 6,690,268 B2 | 2/2004 | Schofield et al. | |
| 6,824,281 B2 | 11/2004 | Schofield et al. | |
| 6,899,437 B2 | 5/2005 | Bauer | |
| 6,961,195 B2 | 11/2005 | Inagaki | |
| 7,004,593 B2 | 2/2006 | Weller et al. | |
| 7,195,381 B2 | 3/2007 | Lynam et al. | |
| 7,224,324 B2 | 5/2007 | Quist et al. | |
| 7,249,860 B2 | 7/2007 | Kulas et al. | |
| 7,287,868 B2 | 10/2007 | Carter et al. | |
| 7,289,037 B2 * | 10/2007 | Uken et al. | 340/815.4 |
| 7,338,177 B2 * | 3/2008 | Lynam | 359/839 |
| 7,568,810 B2 | 8/2009 | Kulas et al. | |

* cited by examiner

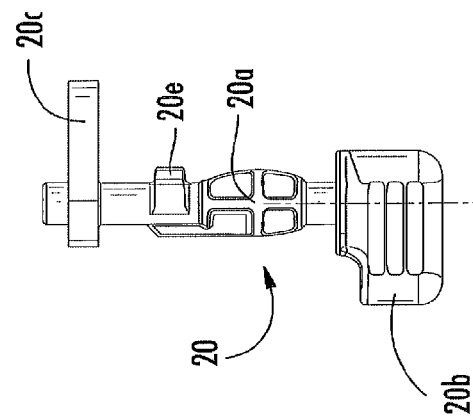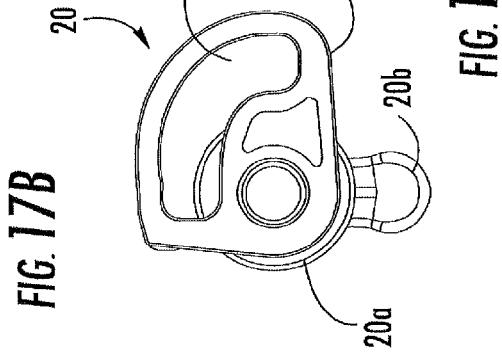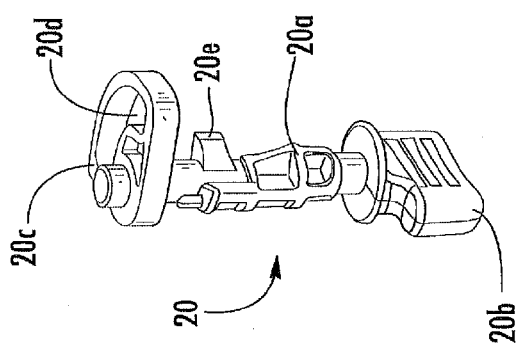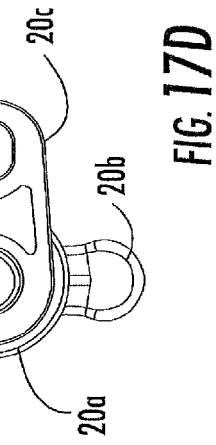
FIG. 17A
FIG. 17B
FIG. 17C
FIG. 17D

INTERIOR REARVIEW MIRROR ASSEMBLY

CROSS REFERENCE TO RELATED APPLICATIONS

The present application is a continuation of U.S. patent application Ser. No. 12/534,544, filed Aug. 3, 2009, now abandoned, which is a continuation of U.S. patent application Ser. No. 11/828,192, filed Jul. 25, 2007, now U.S. Pat. No. 7,568,810, which is a divisional application of U.S. patent application Ser. No. 10/933,842, filed Sep. 3, 2004, now U.S. Pat. No. 7,249,860, which claims benefit of U.S. provisional application Ser. No. 60/500,858, filed Sep. 5, 2003, which are hereby incorporated herein by reference in their entireties.

FIELD OF THE INVENTION

The present invention relates generally to interior rearview mirror assemblies and, more particularly, to prismatic interior rearview mirror assemblies. However, aspects of the present invention may be equally suitable for use in electro-optic mirror assemblies, such as electrochromic interior rearview mirror assemblies.

BACKGROUND OF THE INVENTION

It is well known in the automotive mirror art to provide a prismatic interior rearview mirror assembly that includes a toggle device that may pivot the mirror casing and reflective element between a daytime position and a nighttime position, to adjust the reflectivity angle of the reflective element. Typically, prismatic interior rearview mirror assemblies include a flip mechanism or toggle, which flips or toggles the mirror reflective element between a full reflectivity daytime position and a reduced reflectivity nighttime position; such as the toggle assembly disclosed in U.S. Pat. No. 6,318,870, which is hereby incorporated herein by reference. Some minor assemblies include other forms of flip or toggle mechanisms, such as a rotary type mechanism, such as disclosed in U.S. Pat. No. 6,329,925, which is hereby incorporated herein by reference, or the like. These toggle assemblies or mechanisms may work well for their intended purposes, but may not be readily assembled in a quick and efficient manner by an operator at a mirror assembly plant or facility.

Also, toggle assemblies or mechanisms are typically attached to the rear casing of the minor assembly, while the reflective element is attached to or supported at the bezel portion of the mirror assembly. The weight of the prismatic reflective element thus is often supported by or transferred through the plastic connectors that connect or snap the bezel portion to the rear casing of the mirror assembly. The mirror assembly thus may encounter vibrational concerns due to the non-direct supporting of the reflective element.

Therefore, there is a need in the art for an interior rearview mirror assembly that overcomes the shortcomings of the prior art.

SUMMARY OF THE INVENTION

The present invention provides an interior rearview mirror assembly that includes a toggle mechanism and attachment plate that facilitate efficient assembly of the mirror assembly, and allow the reflective element, such as a prismatic reflective element, along with the attachment plate and an electronic circuitry element, such as a printed circuit board or the like, and associated accessories, to be directly supported on the mounting arm or mounting assembly of the interior rearview mirror assembly. The mirror assembly may be readily assembled in an organized and efficient manner by an operator at a mirror assembly plant or facility.

According to an aspect of the present invention, an attachment plate is secured to a reflective element and an electronic circuitry element, such as an electronic circuitry board, such as a printed circuit board, is attached to the attachment plate. The attachment plate includes at least one mounting member protruding through the electronic circuitry element for engaging a mounting assembly that mounts the mirror assembly to an interior portion of the vehicle and directly supports the attachment plate, along with the electronic circuitry element and the reflective element at an end of the mounting assembly.

The reflective element may comprise a prismatic reflective element and the mounting assembly may include a toggle portion that pivotably or adjustably mounts to the at least one mounting member. The mirror assembly may include a cam actuator for adjusting the toggle portion. The cam actuator may pivotally mount to a second mounting member protruding through an opening in the printed circuit board and may adjustably connect to the toggle portion, such that pivotal movement of the cam actuator by a user of the mirror assembly causes a corresponding adjustment of the reflective element and attachment plate relative to the toggle portion of the mounting assembly and, thus, relative to the user of the mirror assembly.

The reflective element may comprise an electro-optic or electrochromic mirror assembly and the attachment plate may include a ball stud or ball member or ball socket that may be insert molded in or otherwise attached to the attachment plate. The mounting arm or member of the mounting assembly may be snapped onto or may pivotally receive the ball stud or may pivotally insert or snap into the ball socket to pivotally or adjustably mount the attachment plate and reflective element and electronic circuitry element to the mounting assembly.

Therefore, the interior rearview mirror assembly of the present invention provides for a direct support of the reflective element, attachment plate and electronic circuitry element or printed circuit board on the mounting assembly, such that the bezel and casing connection does not have to support and transfer the load of the reflective element. The interior rearview mirror assembly of the present invention thus may provide enhanced vibrational performance of the mirror assembly. This may be particularly beneficial and/or desirable for applications where one or more accessories, such as displays, lights, and/or the like, are included on the printed circuit board or within the mirror casing, because the additional accessories may add to the weight of the supported components, which may adversely affect the vibration performance of the mirror assembly. The attachment plate and mounting assembly and cam actuator of the present invention also facilitate enhanced assembly processing of the mirror assembly, such that the mounting assembly and cam actuator may be readily and efficiently attached to or mounted to the attachment plate to adjustably mount or attach the attachment plate and the reflective element to the mounting assembly.

These and other objects, advantages, purposes and features of the present invention will become apparent upon review of the following specification in conjunction with the drawings.

BRIEF DESCRIPTION OF THE DRAWINGS

FIGS. 17A-D are views of a cam actuator in accordance with the present invention;

DESCRIPTION OF THE PREFERRED EMBODIMENTS

Figure 1:
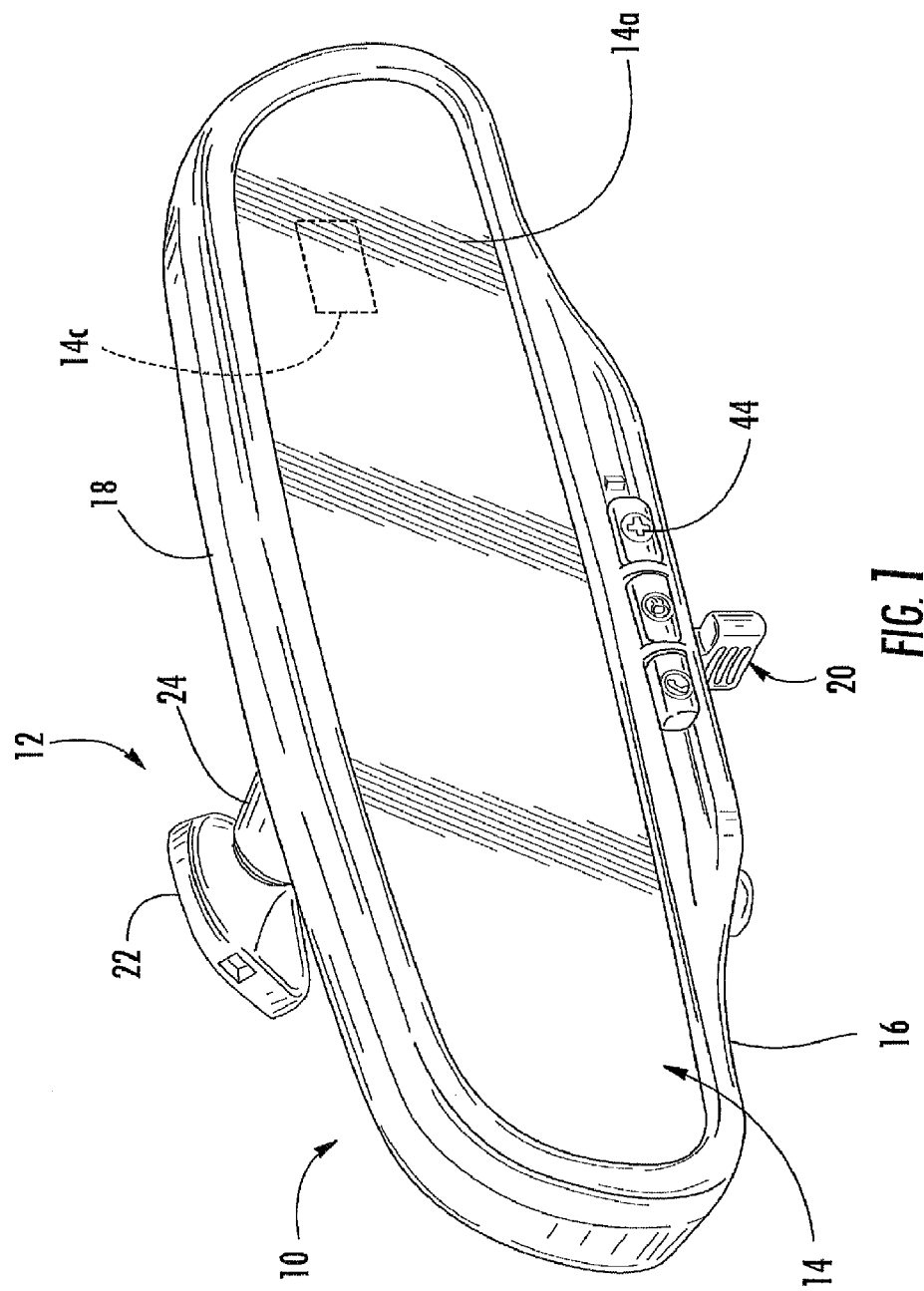
FIG. 1 is a perspective view of an interior rearview minor assembly in accordance with the present invention.

Referring now to the drawings and the illustrative embodiments depicted therein, an interior rearview mirror assembly 10 is pivotally or adjustably mounted to an interior portion of a vehicle, such as via a double ball mounting or bracket assembly 12 (FIG. 1). Mirror assembly 10 includes a prismatic reflective element 14, a bezel portion 16, a housing or casing 18, and a toggle or flip mechanism or toggle or cam actuator 20 for pivoting or adjusting the reflective element 14 between a full reflectivity daytime position and a reduced reflectivity nighttime position, as is known in the mirror art. The mounting or bracket assembly 12 adjustably mounts the mirror casing 16, reflective element 14 and bezel 16 to an interior portion of the vehicle, such as to an interior surface of a windshield of the vehicle or the like. The interior rearview mirror assembly 10 may include one or more electronic accessories, such as displays or display elements, lights, microphones, user actuatable controls or inputs 44, and/or the like, which may be attached to or connected to an electronic circuitry element, such as an electronic circuitry board, such as a printed circuit board 30, of mirror assembly 10, as discussed below.

Mirror casing 18 and bezel portion 16 may be formed from various materials but are preferably molded from a resinous polymeric material as is conventionally known in the industry, Reflective element or prism 14 may also be formed from various materials such as plastic or glass or the like, but preferably is glass, and may have a planar front surface 14a extending at an angle to a planar rear surface 14b. Rear surface 14b may be coated with a reflective layer of a metal or metal alloy, such as chromium, aluminum or alloys thereof, as is conventionally known in the industry. Actuation or pivotal movement of cam actuator 20 pivots prism 14 (along with casing 18 and bezel portion 16) relative to mounting assembly 12 to pivot the reflective surface 14b in order to reduce glare during nighttime conditions, as discussed below. When reflective element 14 is pivoted from a full reflectivity day position to a reduced reflectivity night position, reflective surface 14b is rotated such that the uncoated front surface 14a is aligned for viewing by the vehicle driver instead of the reflective rear surface 14b. Reflective rear surface 14b may reflect at least about 60% to 95% of the light incident thereon, while uncoated front surface 14a may reflect about 4% of the light incident thereon, thereby significantly reducing glare from headlights or other bright lights to the rear of the vehicle to the driver's eyes.

Mounting assembly 12 includes a mounting base portion 22, which may mount or attach to a mounting member at the interior portion of the vehicle, such as to a mounting button or the like at the interior surface of the windshield. The mounting button or the like may be secured, such as by bonding or by a suitable adhesive, to an interior surface of a vehicle windshield and may be a conventional mounting button or base member, such as the type disclosed in commonly assigned U.S. Pat. No. 4,936,533, issued to Adams et al., the disclosure of which is hereby incorporated herein by reference, or a breakaway mount such as the type disclosed in commonly assigned U.S. Pat. Nos. 5,820,097, issued to Spooner; or 5,100,095, issued to Haan et al., the disclosures of which are hereby incorporated herein by reference. Base portion 22 may include a ball member protruding therefrom that is pivotally received in an end of an arm portion 24. Arm portion 24 also pivotally attaches to a toggle portion 26 (FIGS. 7, 10-12 and 16A-E) at its opposite end via pivotable attachment to a second ball member 26a protruding from toggle portion 26. Toggle portion 26 may be adjustably mounted to an attachment plate 28 at the rear surface 14b of prism 14, as discussed below.

Optionally, the mounting arm of the mounting assembly may include a passageway therethrough for routing wiring or the like through the arm to provide electrical communication between the electronic circuitry element or printed circuit board or accessory of the mirror assembly and circuitry or accessories or power source of an accessory module or of the vehicle. For example, the mounting assembly may utilize principles described in U.S. patent application Ser. No. 10/032,401, filed Dec. 20, 2001, now U.S. Pat. Publication No. US2002/0088916A1, published Jul. 11, 2002, now U.S. Pat. No. 6,877,709, which is hereby incorporated herein by reference, or may utilize electrical connection principles of the type described in International Publication No. WO 2003/095269 A3, published Nov. 20, 2003 for REARVIEW MIRROR ASSEMBLIES, which is hereby incorporated herein by reference. Other means for providing electrical power and/or control to the electronic circuitry element or circuitry board and/or accessories of the mirror assembly may be implemented without affecting the scope of the present invention.

Figure 2:
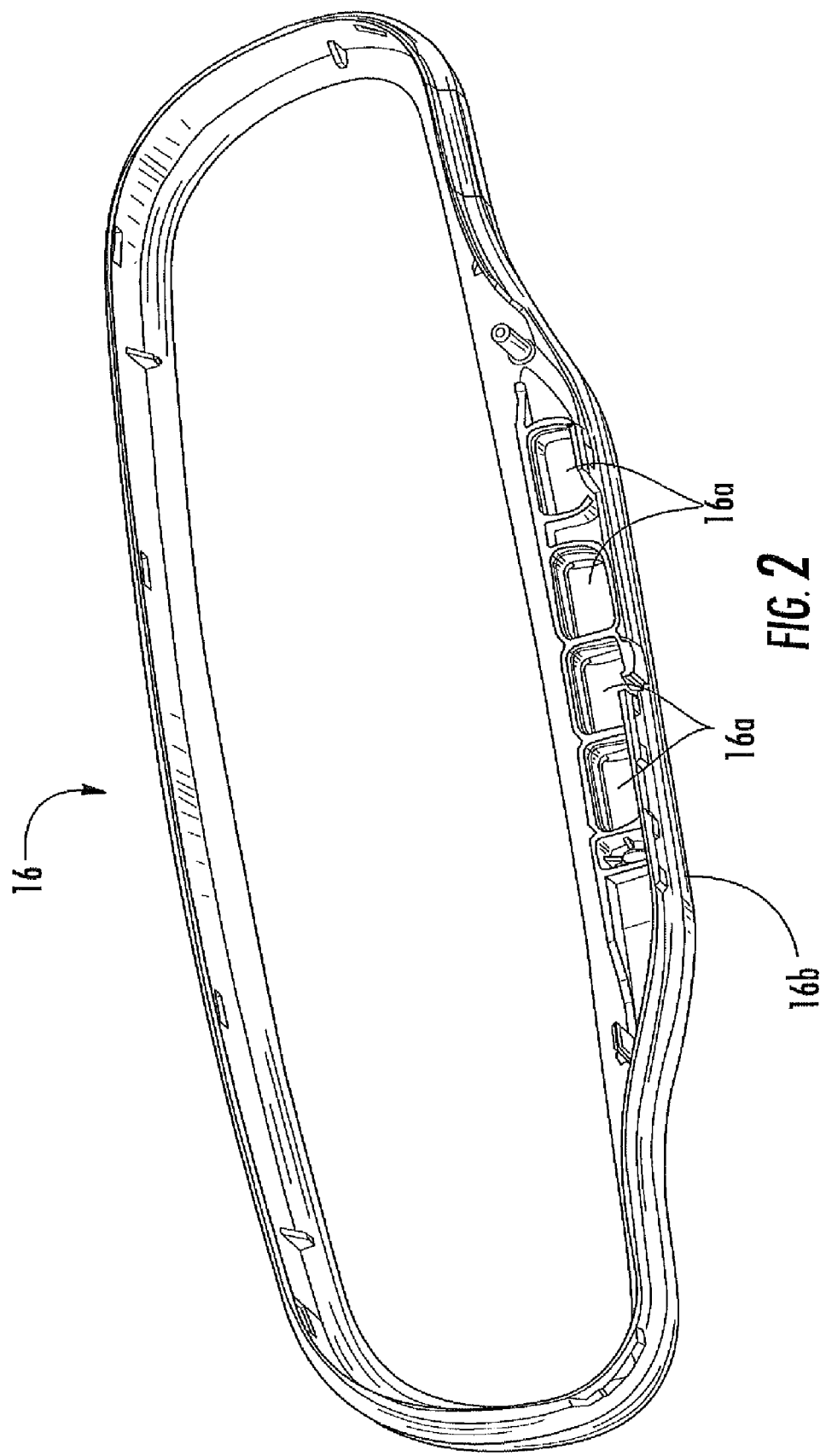
FIG. 2 is a rear perspective view of a bezel portion of the interior rearview mirror assembly of FIG. 1.
Figure 3:
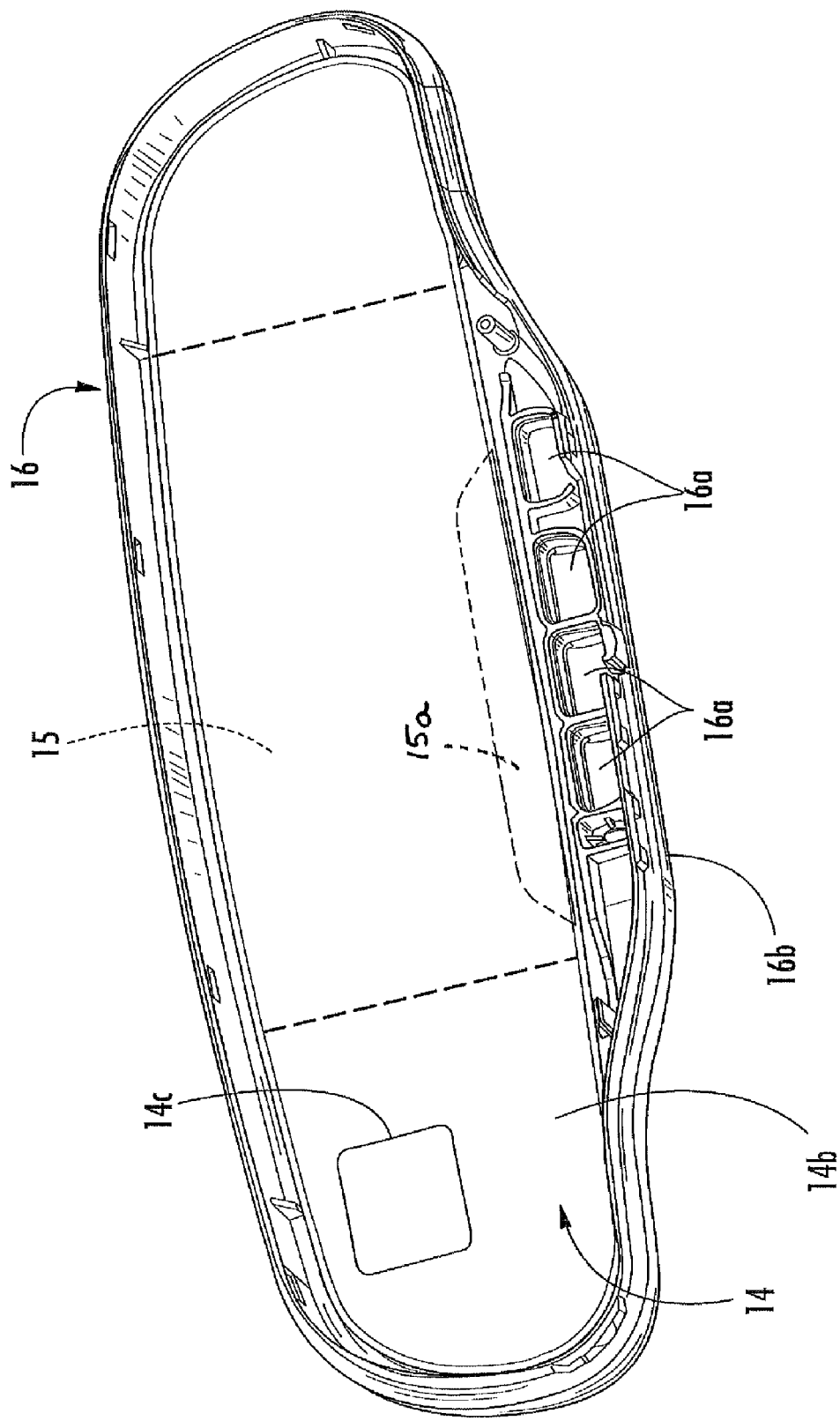
FIG. 3 is a rear perspective view similar to FIG. 2, with a reflective element positioned within a pocket formed by the bezel portion.
Figure 4:
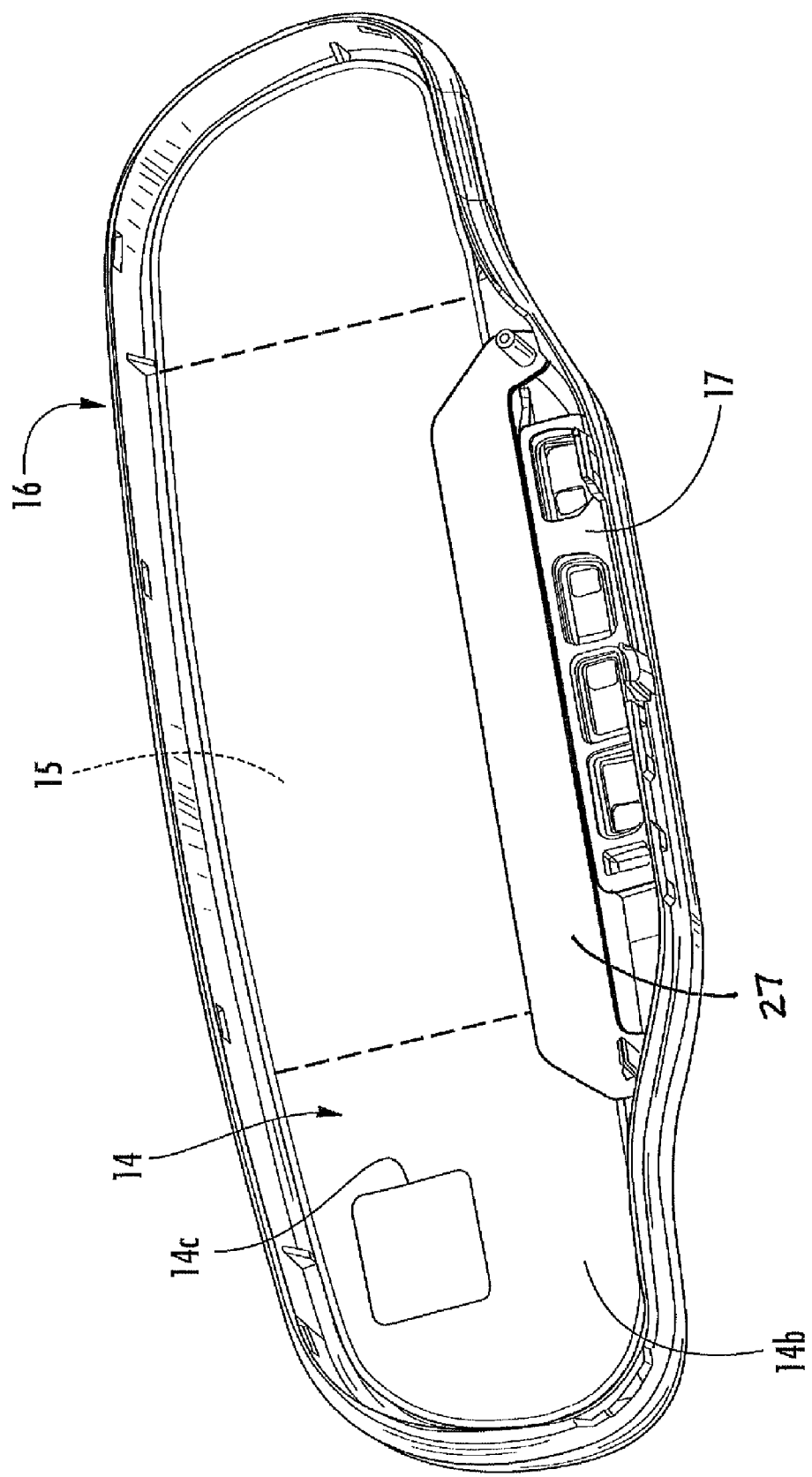
FIG. 4 is a rear perspective view similar to FIG. 3, with a keypad or button cover positioned over and partially through corresponding openings in the bezel portion.

As can be seen in FIG. 2, bezel portion 16 of mirror assembly 10 defines a pocket or recess for receiving the reflective element or prism 14 therein. As shown in FIG. 3, prism 14 may be positioned within the pocket or recess of bezel portion 16, and an adhesive 15, such as a double sided tape or other suitable adhesive or the like, may be applied to rear surface 14b of prism 14. A flexible keypad or keytop or cover 17 (FIG. 4) may be positioned over and at least partially through openings 16a in bezel 16, such as along a chin area or region 16b of bezel 16, for actuating corresponding buttons or switches on an electronic circuitry element or printed circuit board 30 when mirror assembly 10 is assembled. An appliqué 27 may be attached to bezel 16 at chin region 16b so as to be positioned at a display window or cutout region 15a in the adhesive 15 (FIG. 3) along a lower portion of the reflective element 14, as best shown in FIG. 4.

Figure 5:
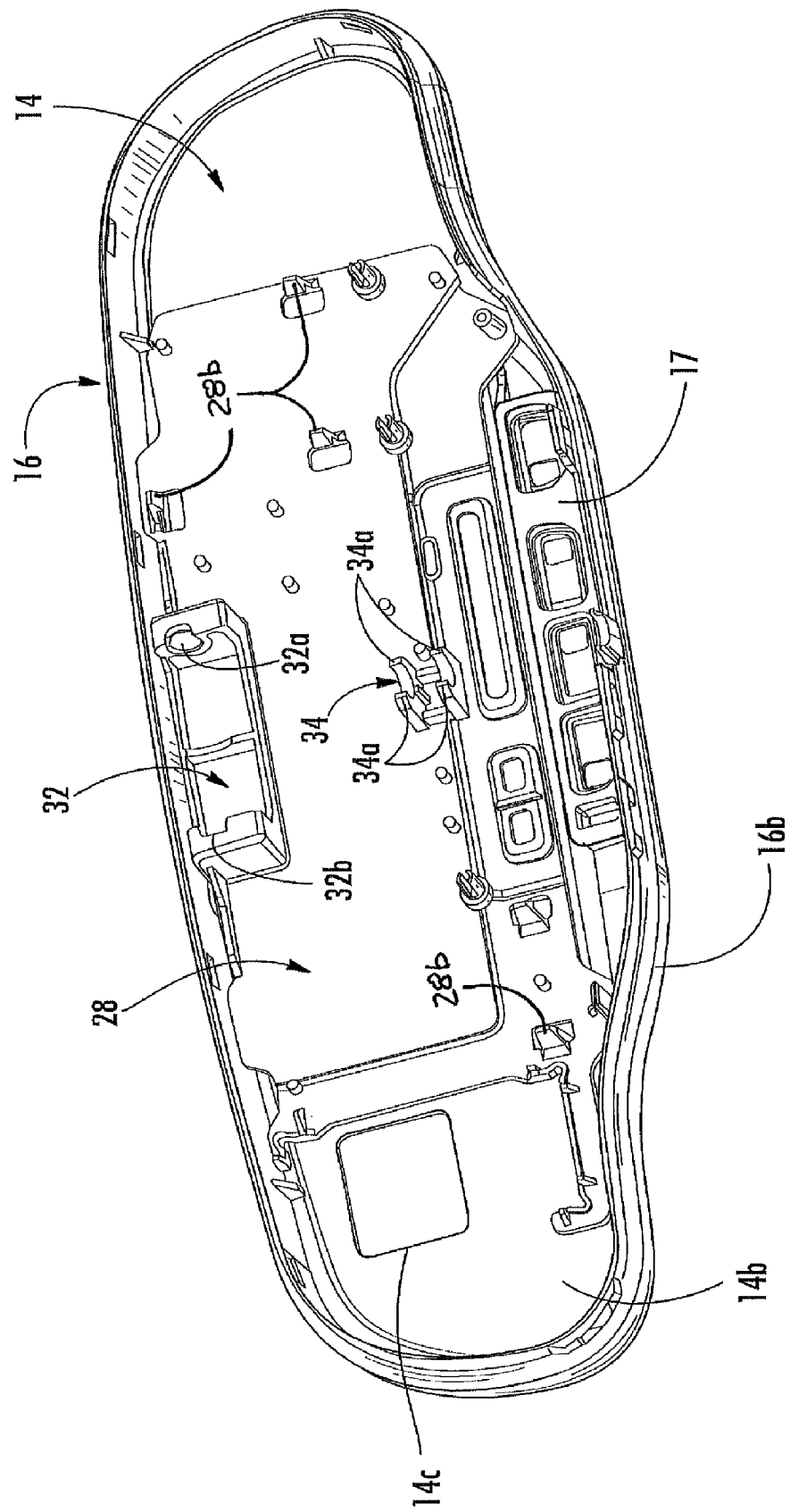
FIG. 5 is a rear perspective view similar to FIG. 4, with an attachment plate mounted to the reflective element.

Mirror assembly 10 includes an attachment plate 28 (FIG. 5) affixed or secured to the rear surface 14b of prism 14. Attachment plate 28 may be pressed against adhesive 15 to secure or affix attachment plate 28 to rear surface 14b of prism 14. Attachment plate 28 may include one or more openings or tabs for engaging corresponding tabs or openings on bezel portion 16 around prism 14 to properly position attachment plate 28 and prism 14 within the recess formed in bezel portion 16. Attachment plate 28 also includes a toggle mounting portion 32 protruding from a rear surface of attachment plate 28 for pivotally or adjustably mounting toggle portion 26 to attachment plate 28, and includes a cam mounting portion 34 protruding from the rear surface for pivotally receiving cam actuator 20. In the illustrated embodiment, toggle mounting portion 32 includes a pair of generally circular openings or recesses 32a positioned inwardly of corresponding narrowed openings or passageways 32b for pivotally receiving protrusions 26c of toggle portion 26, while cam attachment portion 34 comprises a pair of hooks or arms 34a protruding outwardly from attachment plate 28 for pivotally receiving a shaft portion 20a of cam actuator 20, as discussed below.

Attachment plate 28 receives a printed circuit board (PCB) 30 (FIG. 6) thereon, and pivotally or adjustably receives toggle portion 26 thereon to mount attachment plate 28, printed circuit board 30 and prism 14 to mounting assembly 12, as discussed in detail below. The printed circuit board 30 may comprise or mount or attach one or more accessories, such as lights, a microphone, user actuatable controls or inputs, sensors, such as photo sensors or the like, or any other type of accessory suitable for such an application as discussed below. Although described as a generally rigid printed circuit board (as is known in the electronic circuitry art), the electronic circuitry element may comprise other types of elements, such as a flexible or flex circuit element comprising a non-rigid substrate.

Figure 6:
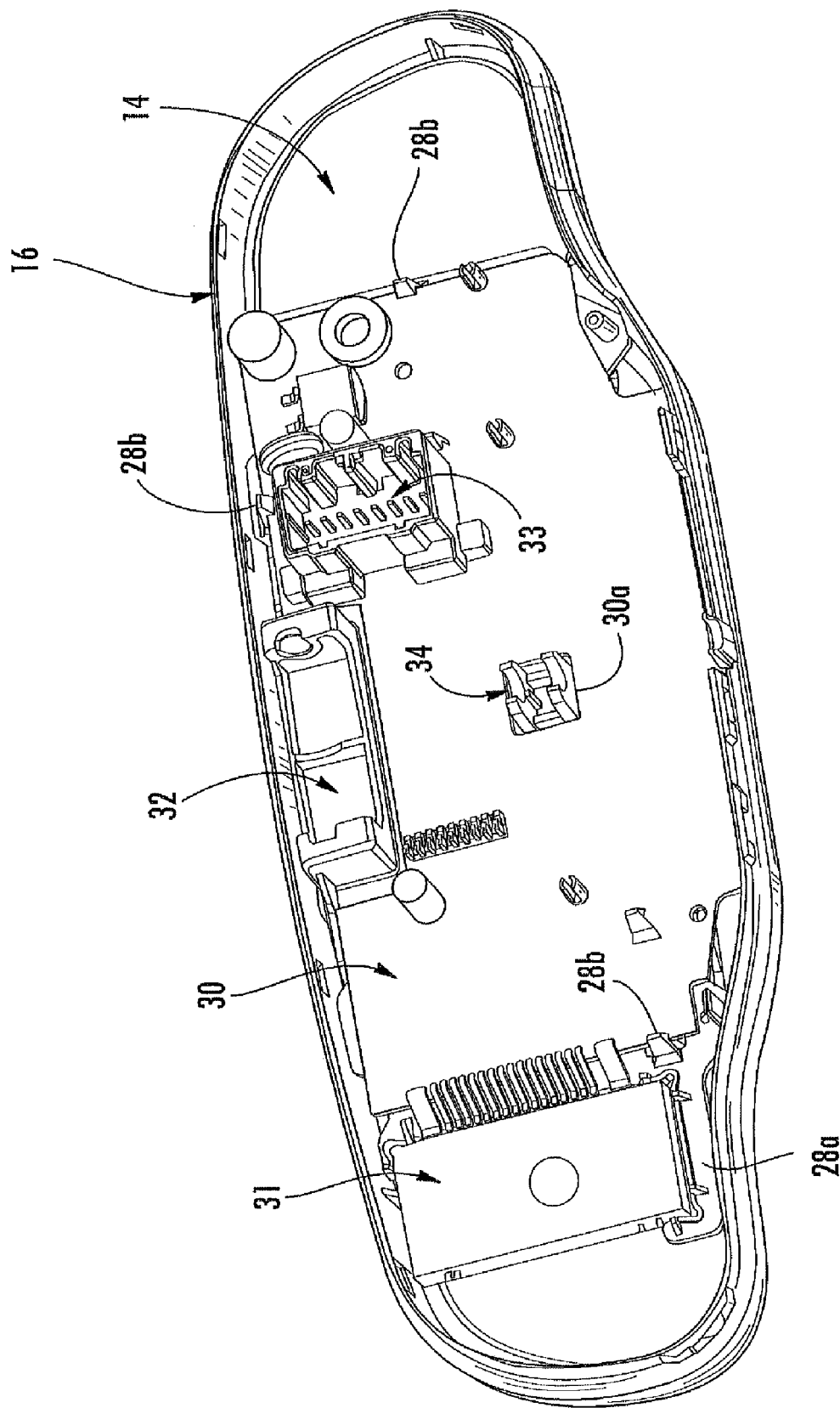
FIG. 6 is a rear perspective view similar to FIG. 5, with a printed circuit board and accessories mounted to the attachment plate.

Electronic circuitry element or printed circuit board 30 may be attached to attachment plate 28, such as via tabs or hooks 28b protruding from attachment plate 28 engaging and retaining printed circuit board 30 around its perimeter edges, such that circuit board 30 is oriented properly on attachment plate 28 and secured thereto. As can be seen in FIG. 6, circuit board 30 is formed to fit around the toggle mounting portion 32 of attachment plate 28 and includes an opening or aperture 30a therethrough to accommodate insertion of cam mounting portion 34 of attachment plate through opening 30a as circuit board 30 is attached to attachment plate 28. Arms 34a of cam mounting portion 34 thus may protrude rearwardly through circuit board 30 for receiving cam actuator 20, as discussed below. The toggle mounting portion 32 also protrudes from the attachment plate 28 and through the circuit board 30, such as through a recess or cutout or notch along an upper region of the circuit board. The toggle mounting portions thus at least partially protrude through an aperture or opening or notch or cutout or recess formed in the circuit board so as to be accessible when the circuit board is attached to the attachment plate. Although shown in FIG. 5 as being attached to the prism with the circuit board not yet attached, it is envisioned that the attachment plate 28 may be provided to a mirror manufacturer or assembler with the electronic circuitry element or printed circuit board already attached to the attachment plate, without affecting the scope of the present invention, whereby the circuitry element or board and attachment plate assembly may be adhered to or mounted to the rear surface of the prism as a unit in a similar manner as discussed above.

Figure 7:
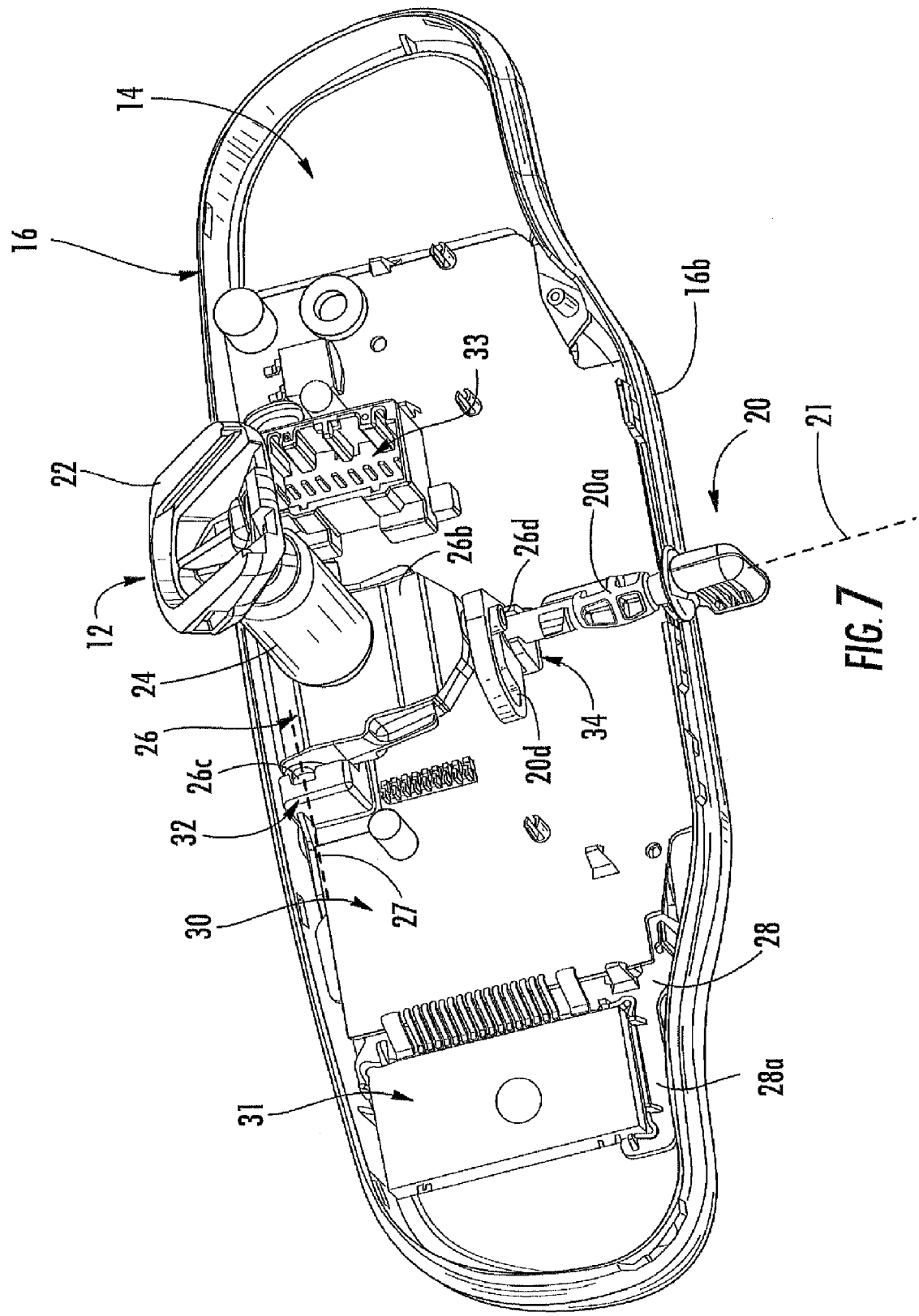
FIG. 7 is a rear perspective view similar to FIG. 6, with the mounting bracket assembly and cam actuator attached to the attachment plate.
Figure 16B:
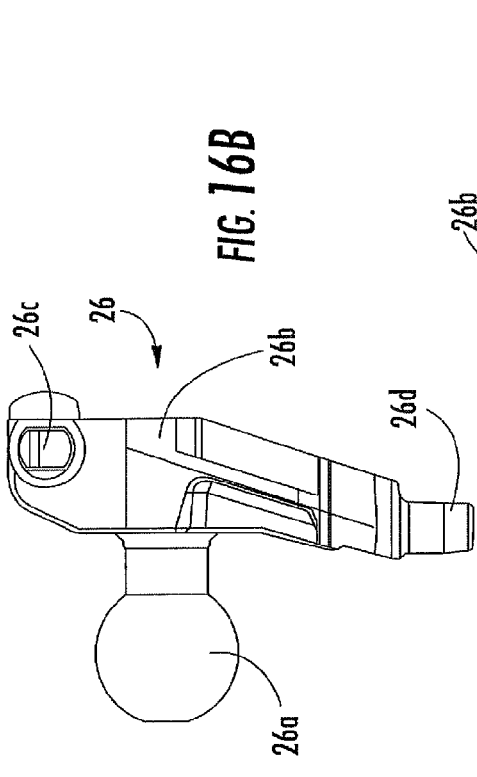
FIGS. 16A-E are views of a toggle member or portion in accordance with the present invention.
Figure 16E:
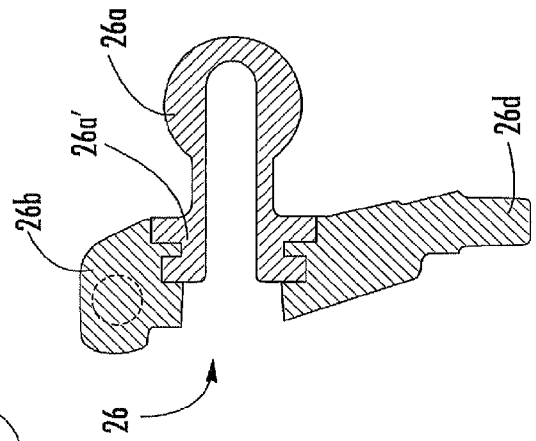
Figure 16A:
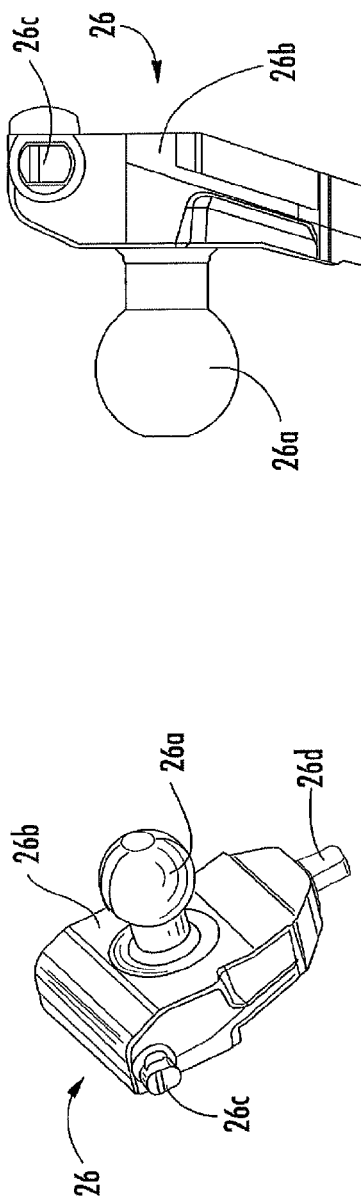
Figure 16D:
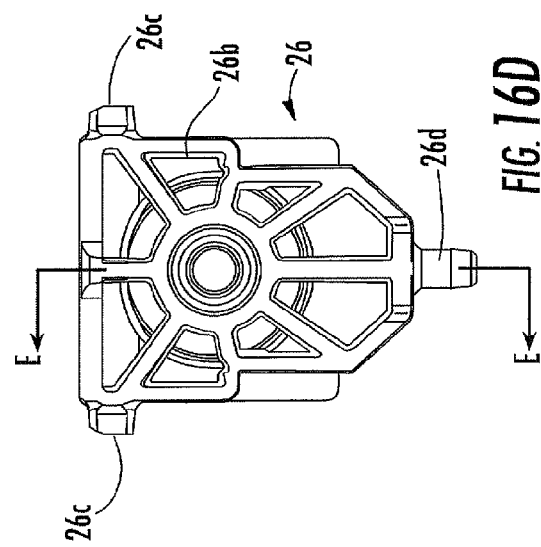
Figure 16C:
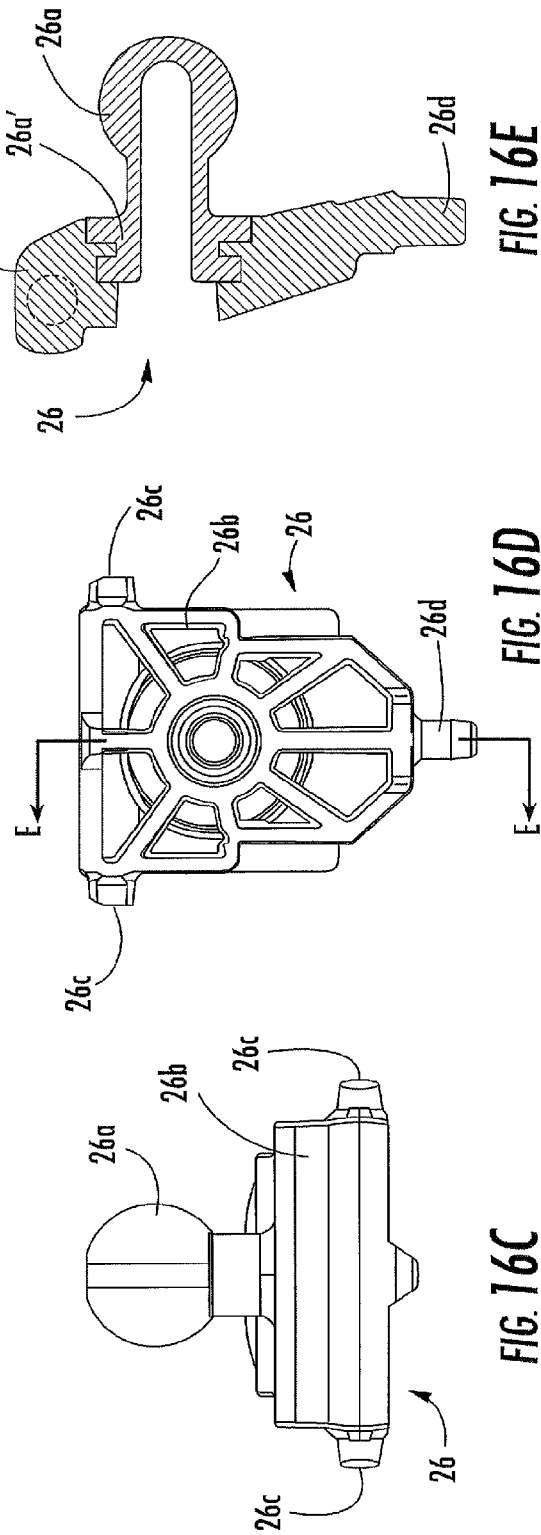
Figure 18B:
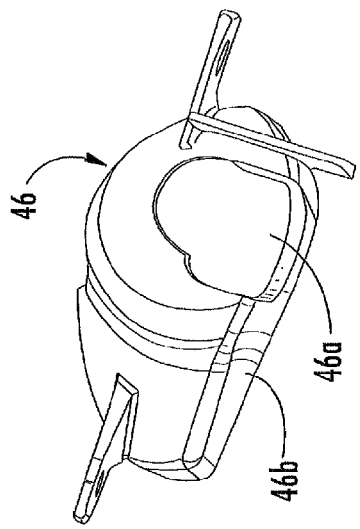
FIGS. 18A-D are views of a light reflector for a mirror light in accordance with the present invention.
Figure 18D:
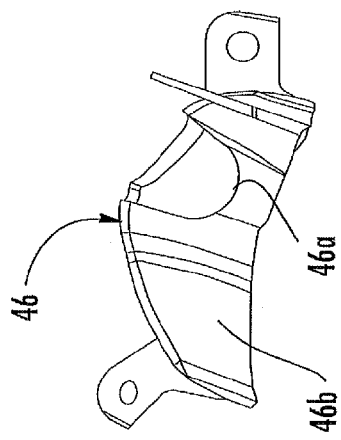
Figure 18A:
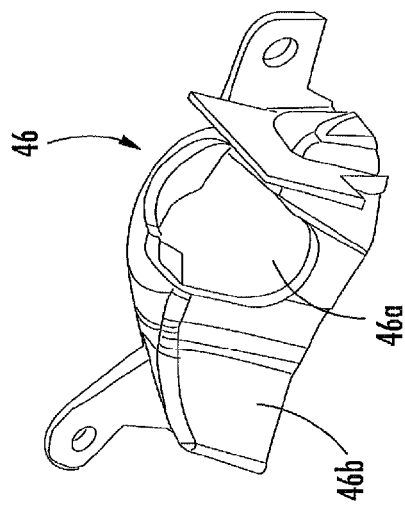
Figure 18C:
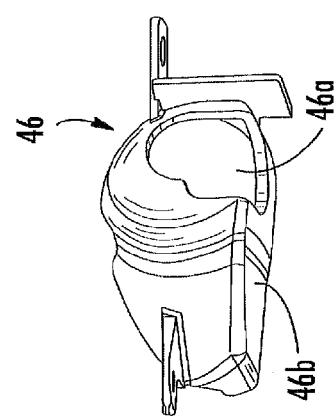

As shown in FIG. 7, toggle portion 26 of mounting assembly 12 may be adjustably mounted to toggle mounting portion 32 of attachment plate 28 to mount attachment plate 28 (and prism 14, circuit board 30 and bezel 16 and casing 18) to the mounting assembly 12 and thus to the interior portion of the vehicle. With reference to FIGS. 7 and 16A-E, toggle portion 26 includes a ball member 26a protruding from a base portion 26b. Ball member 26a may comprise a metallic material, such as aluminum or the like, or may comprise a molded polymeric material or the like, and may protrude from the base or body portion 26b of toggle portion 26 and, as shown in FIG. 16E, the ball member 26a may have a base portion 26a' insert molded within the body portion 26b of toggle portion 26. Optionally, the ball member may otherwise be attached to or formed to or with the body portion of the toggle portion, without affecting the scope of the present invention. Optionally, the toggle portion and ball member may comprise a die cast toggle portion, without affecting the scope of the present invention.

In the illustrated embodiment, toggle portion 26 includes a pair of protrusions 26c protruding from opposite sides of one end of body portion 26*b* and a third protrusion or extension 26*d* extending from body portion 26*b* at an end of the body portion generally opposite the protrusions 26*c*. Side protrusions 26*c* of toggle portion 26 may comprise non-cylindrical protrusions or members having a generally truncated cylindrical shape, where the sides of the cylindrical shapes are removed or cut to form generally oval-shaped protrusions. The non-cylindrical side protrusions 26*c* function to pivotally mount and retain toggle portion 26 to an attachment plate 28 of the mirror assembly, while the end protrusion 26*d* functions to engage an arcuate slot 20*d* in cam actuator 20, as discussed below.

Toggle portion 26 is pivotable about an axis 27 to adjust the reflective element or prism 14 between the daytime and nighttime positions in response to pivotal movement of cam actuator 20 about another axis 21 (FIG. 7). As best shown in FIGS. 7 and 17A-C, cam actuator 20 includes a shaft portion 20*a* that generally defines pivot axis 21, a knob or lever portion 20*b* for a user to grasp and turn or rotate to pivot cam actuator 20 about pivot axis 21 (such as about 90 degrees or thereabouts), and a slotted end portion 20*c* defining a generally arcuate slot 20*d* therealong. Arcuate slot 20*d* is formed to receive end protrusion 26*d* of toggle portion 26, such that pivotal movement or adjustment of cam actuator 20 about axis 21 causes a lifting or lowering or an adjustment of the orientation of attachment plate 28 relative to toggle portion 26 (such as about a 4½ degree change or thereabouts in the angle of attachment plate 28 relative to body portion 26*b* of toggle portion 26), as discussed below. Cam actuator 20 also includes a raised lobe or portion 20*e* along shaft portion 20*a* for engaging a leaf spring 36 (FIG. 13) or the like on casing 18 for biasing or urging or retaining the cam actuator in one of the positions corresponding to the daytime and nighttime positions of the prism, as also discussed below.

Figure 8:
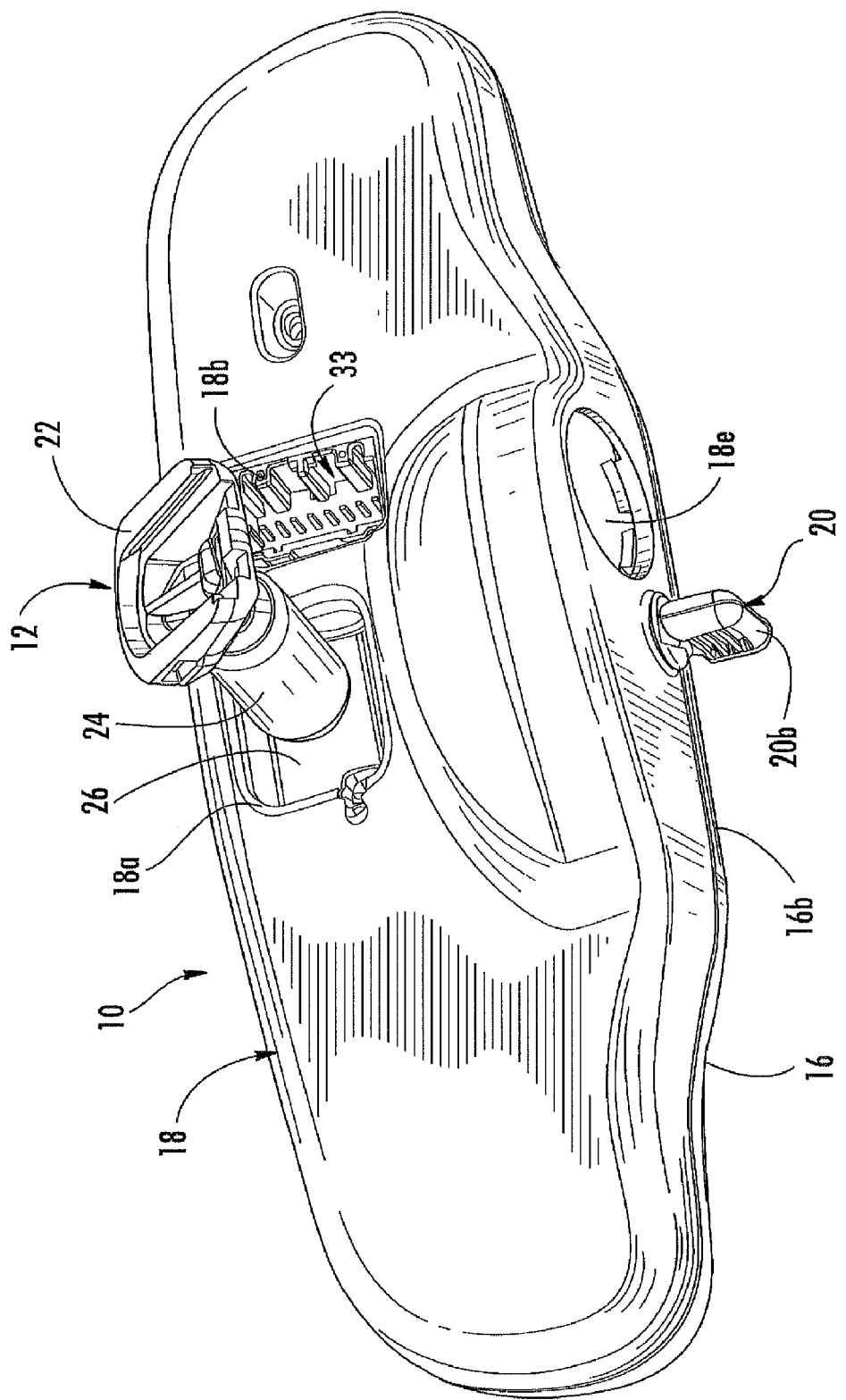
FIG. 8 is a rear perspective view of the mirror assembly, with the rear casing attached to the bezel.

The prism 14, attachment plate 28, electronic circuitry element or circuit board 30, mounting assembly 12 and cam actuator 20 of mirror assembly 10 may be readily assembled together at the bezel portion 16, as discussed in detail below with reference to FIGS. 9-15. The attachment plate 28 and mounting assembly 12 may facilitate mounting or and supporting the prism 14, circuit board 30 and attachment plate 28 directly on the mounting assembly 12. Such a mounting arrangement limits the load at the junction of the bezel portion 16 and the casing 18, and may provide enhanced vibrational performance to the mirror assembly. Casing 18 may include an opening or aperture 18*a* (FIG. 8) for receiving base 22 and arm 24 of mounting assembly 12 therethrough to assemble the casing to the bezel.

Optionally, electronic circuitry element or circuit board 30 may provide a display device or element 31 for displaying information through a portion or window 14*c* of the prism 14 for viewing through the prism by a driver or occupant of the vehicle. The display circuit board or device 31 may be positioned at a desired area along the prism 14 and may be positioned against the rear surface 14*b* of prism 14, such as in an area where the attachment plate 28 does not cover. As shown in FIGS. 6 and 7, attachment plate 28 may include a retention frame or member 28*a* for supporting display 31 at the reflective element or prism 14.

Display 31 may comprise a vacuum fluorescent display (VFD), a light emitting diode (LED) display, such as a rosette type compass display of the type disclosed in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference, a display on demand type display, or any other type of display or display element suitable for such an application without affecting the scope of the present invention. The prism 14 may provide a window 14*c* at the display or display element where the reflective coating is removed from the reflective rear surface 14*b* for viewing the display through the prism.

Optionally, it is envisioned that the prismatic reflective element may comprise a display on demand type display area, where the display or display element may be viewable through the reflective element when the display is activated, but the reflective element may be sufficiently reflectant over substantially its entire viewable area, so that the display or display element is not viewable when it is deactivated. Such display on demand type of displays may have a display area such as the types disclosed in U.S. Pat. Nos. 5,668,663; 5,724,187; and/or 6,690,268, and/or U.S. patent application Ser. No. 10/054,633, filed Jan. 22, 2002 by Lynam et al. for VEHICULAR LIGHTING SYSTEM, now U.S. Pat. No. 7,195,381, which are hereby incorporated herein by reference. Optionally, a variety of reflective coatings or layers or reflectors may be deposited or disposed on the second or rear surface of the prismatic element and may include a stack of layers such as the types described in PCT Application No. PCT/US03/29776, filed Sep. 19, 2003, and published Apr. 1, 2004 as International Publication No. WO 2004/026633 A2, which is hereby incorporated herein by reference.

Electronic circuitry element or circuit board 30 may include an electrical connector 33 for connecting to an electrical wire and connector from a power source and/or control of the vehicle in order to provide electrical power and control to the accessories of the printed circuit board and/or of the mirror assembly 10. Casing 18 may include an opening or aperture 18*b* for receiving a connector of the vehicle wiring therethrough to connect the vehicle wiring to the electrical connector 33 of circuit board 30 of mirror assembly 10.

Figure 8A:
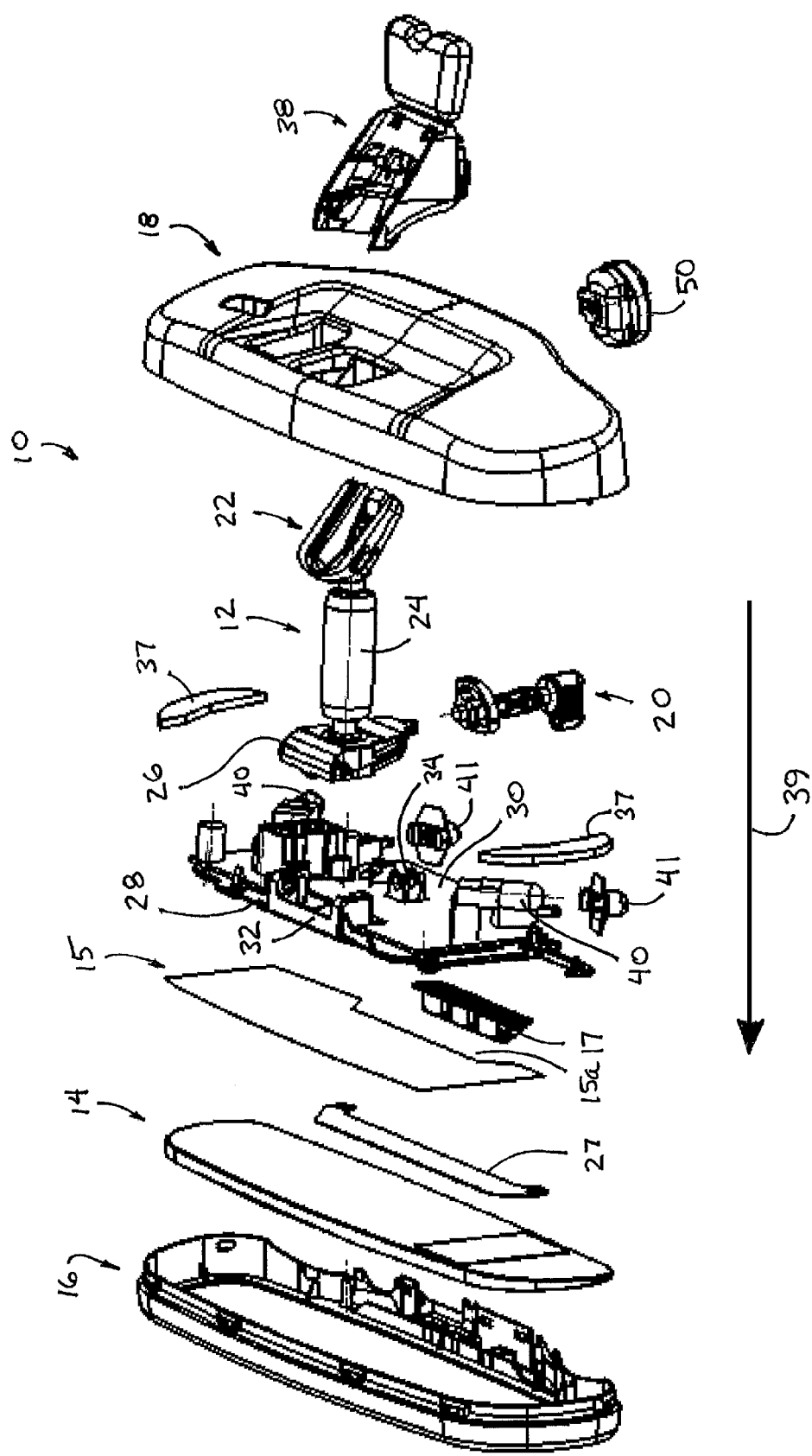
FIG. 8A is an exploded perspective view of the mirror assembly of FIG. 8.

With reference to FIGS. 8A-15, the process of assembling the mounting assembly 12 to the attachment plate 28 of mirror assembly 10 is shown. The mirror assembly is shown in FIGS. 8A-15 as substantially the same mirror assembly as in FIGS. 1-8, except that the mirror assembly is shown with an electronic circuitry element or circuitry board or printed circuit board 30' that does not include a display and that does include light sources or illumination sources 40 and buttons 41 for actuating the light sources. As best shown in FIG. 8A, the entire assembly of the components of the mirror assembly may be made along a common axis 39, whereby the components are loaded or placed into the assembly along the common axis 39. For example, the bezel portion may be attached to or mounted to an assembly fixture or jig, and the components may then be loaded to or attached to the bezel portion or assembly along generally the same or common axis or z-axis of the mirror assembly. This loading along a common z-axis facilitates assembly of the mirror either by manual assembly processes or by robotic/machine assembly processes.

Figure 9:
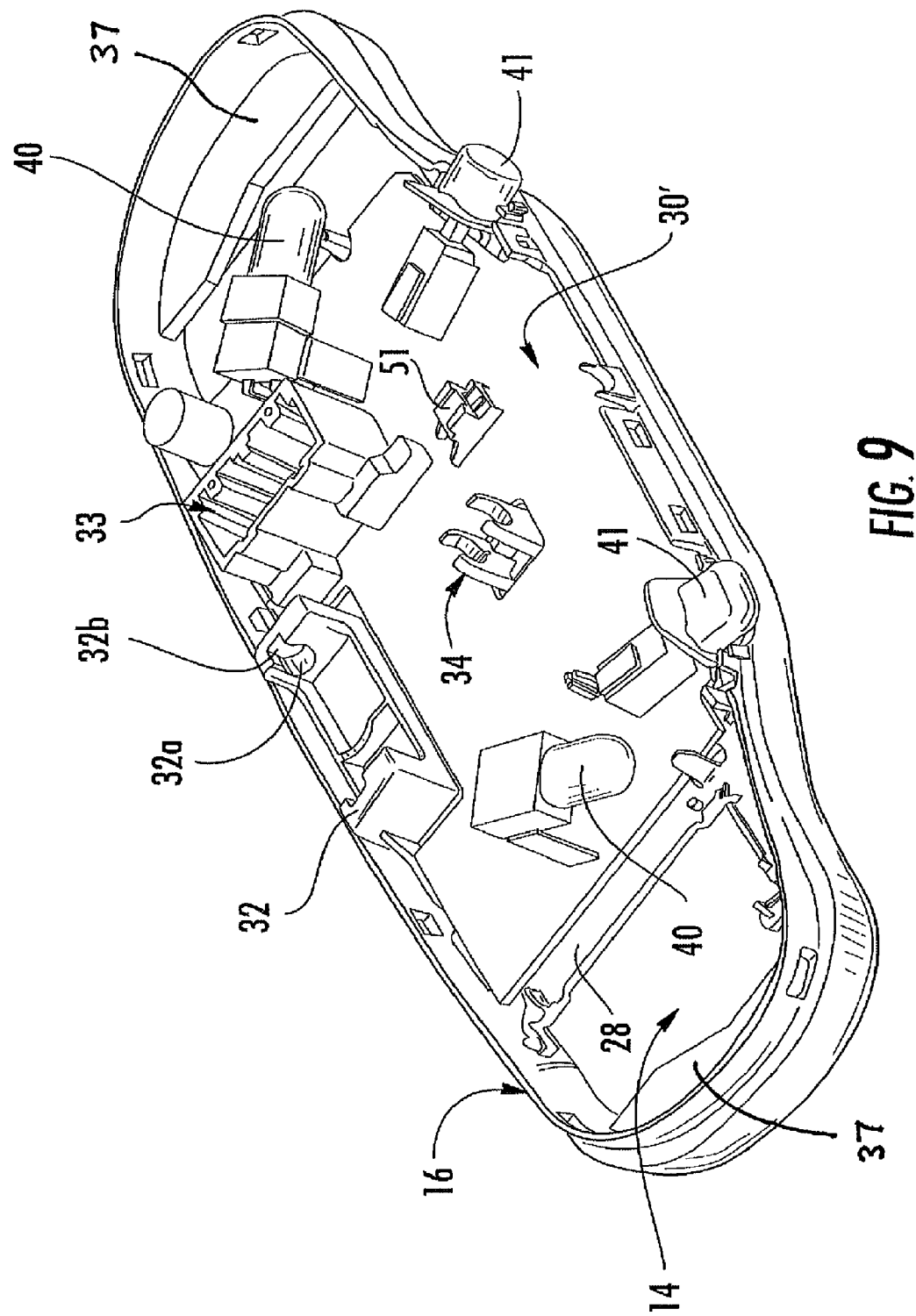
FIG. 9 is a rear perspective view similar to FIG. 6, with a circuit board having light sources attached thereto mounted to the attachment plate.
Figure 10:
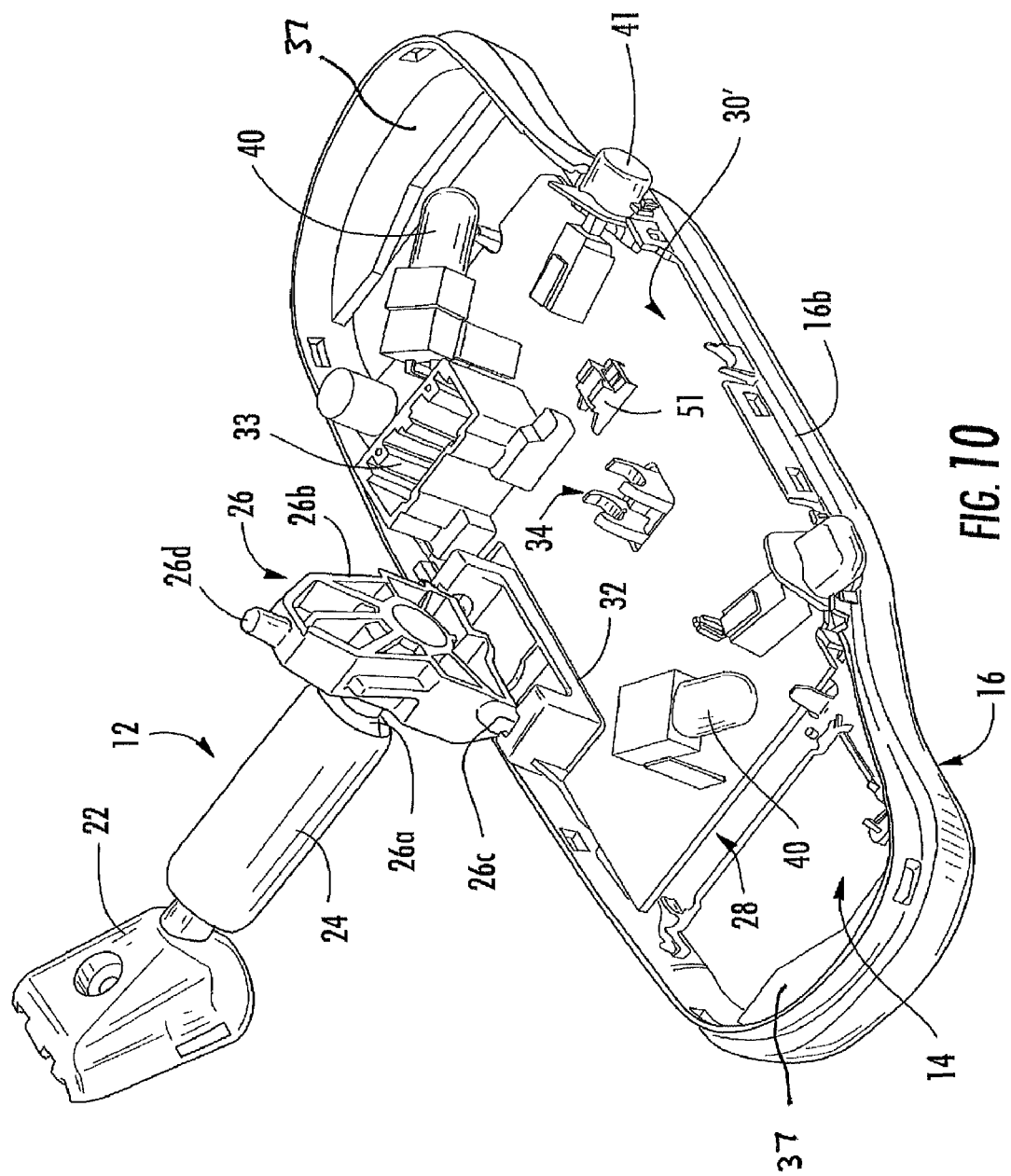
FIG. 10 is a rear perspective view similar to FIG. 9, with the toggle and mounting bracket assembly positioned at a toggle mounting portion of the attachment plate.
Figure 11:
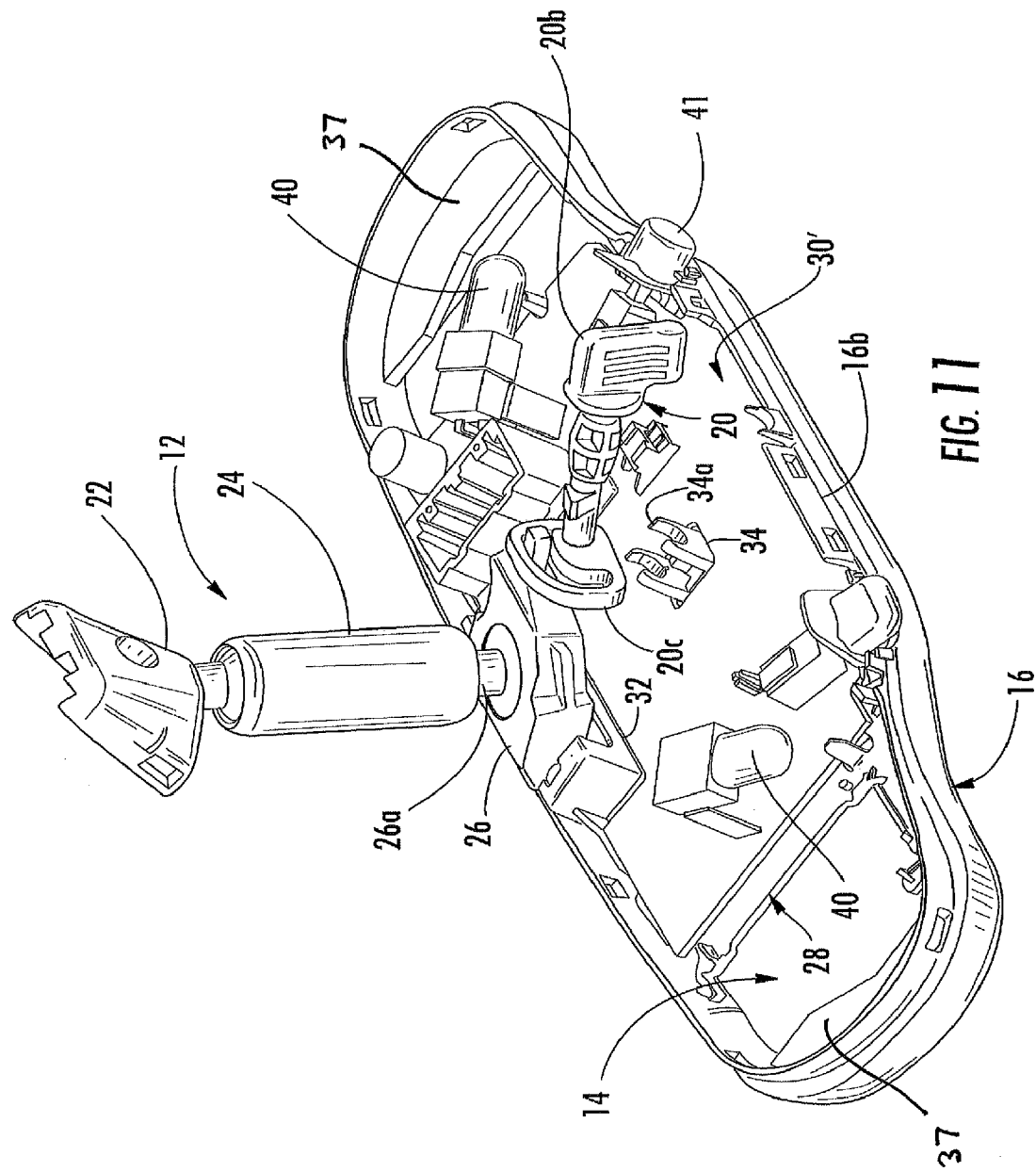
FIG. 11 is a rear perspective view similar to FIG. 10, with the toggle and mounting bracket assembly being pivoted toward and into engagement with a cam or pivoting actuator.
Figure 12:
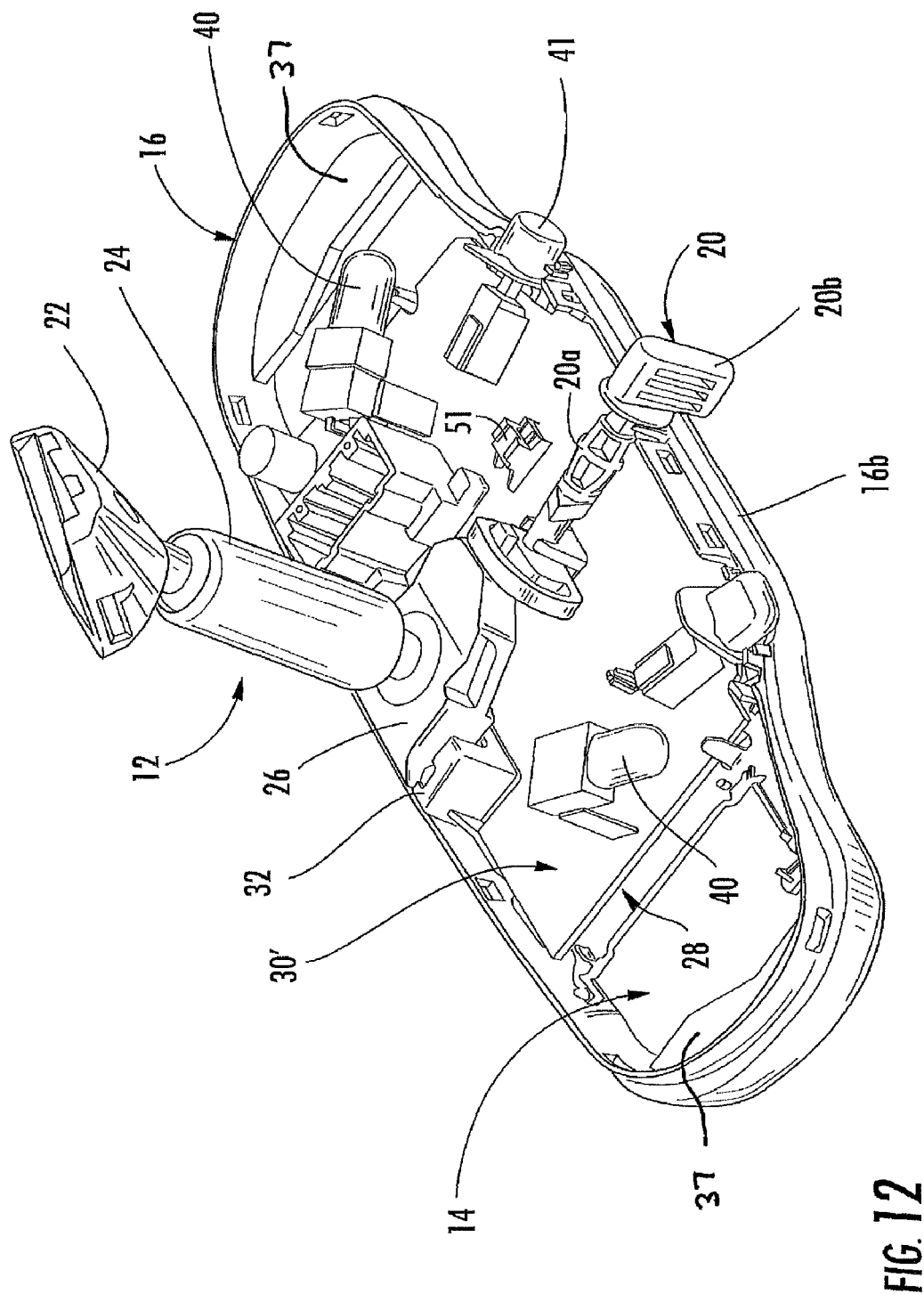
FIG. 12 is a rear perspective view similar to FIG. 11, with the toggle being pivoted into its in use position generally along the printed circuit board and in engagement with the cam or pivoting actuator, which is snapped in place at the attachment plate.
Figure 12A:
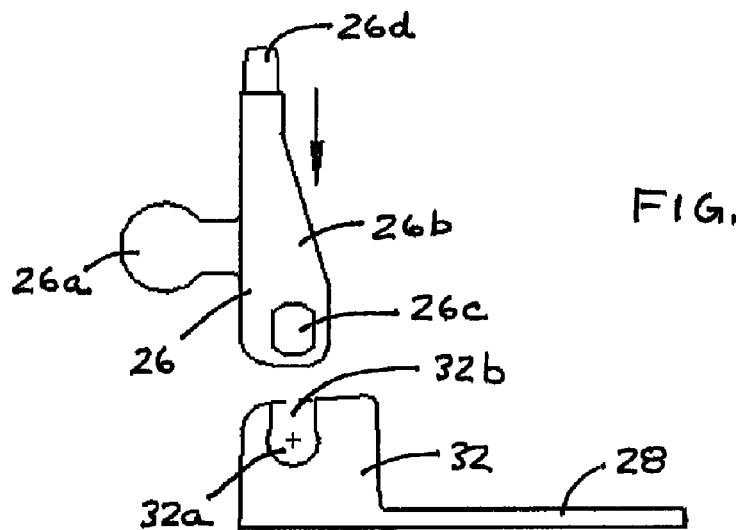
FIG. 12A is a side elevation of the toggle as it is inserted into the toggle mounting portion of the attachment plate.
Figure 12B:
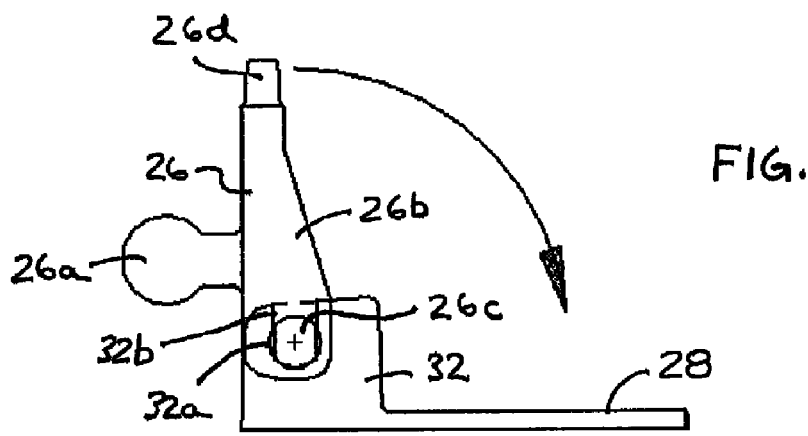
FIG. 12B is a side elevation similar to FIG. 12A showing the pivotal movement of the toggle when mounted to the attachment plate.

With reference to FIGS. 8A and 9, the circuit board 30' and attachment plate 28 may be affixed to the rear surface of the prism, as discussed above. As shown in FIGS. 10-12, mounting assembly 12 may be mounted to attachment plate 28 via pivotal connection of toggle portion 26 with toggle mounting portion 32, which protrudes through the opening or cutout or recess or notch in the printed circuit board or electronic circuitry element 30'. When mounting assembly 12 and toggle portion 26 are oriented as shown in FIG. 10, 12A and 12B, side protrusions 26*c* of toggle portion 26 may be inserted in their lengthwise direction through narrowed passageways 32*b* until the side protrusions are generally within the circular openings 32*a*. As best shown with reference to FIGS. 12B and 12C, the non-cylindrical protrusions 26*c* may then pivot within the circular openings 32a of attachment plate 28 to facilitate pivotal movement of toggle portion 26 relative to attachment plate 28 (shown in FIGS. 12A-C without the cam mounting portion 34 for purposes of clarity).

Figure 12C:
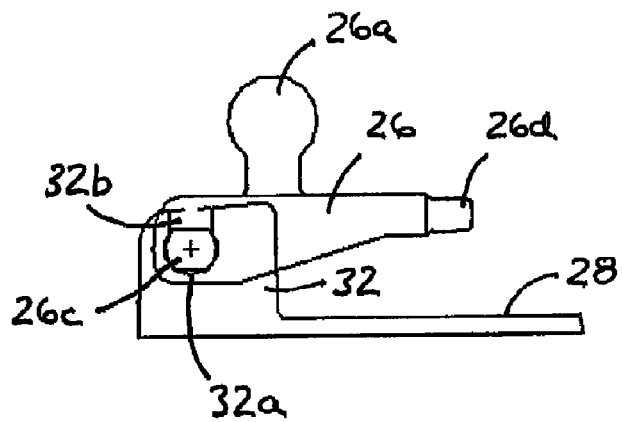
FIG. 12C is a side elevation similar to FIGS. 12A and 12B showing the toggle pivoted to its in use position generally along the attachment plate.

Toggle portion 26 may thus be pivoted (as can be seen with reference to FIGS. 10-12C) toward the circuit board 30' and attachment plate 28, such that the toggle portion is indexed downward so as to be positioned generally along the attachment plate (as shown in FIG. 12C). When so positioned, the non-cylindrical protrusions 26c are positioned within the circular openings 32a so that their narrowed dimension is not aligned with the narrowed channels 32b of toggle mounting portion 32. The protrusions 26c, and thus the toggle portion 26, thus are not readily removable from the toggle mounting portion 32 when the toggle portion is pivoted to its in use position and generally along the attachment plate.

As toggle portion 26 is pivoted toward the circuit board 30', end protrusion 26d may insert through arcuate slot 20d in slotted end 20c of cam actuator 20, which then may be snapped into or between the hooks or arms 34a of cam mounting portion 34 of attachment plate 28. When mounted to cam mounting portion 34 of attachment plate 28, lever portion 20b of cam actuator 20 may extend downwardly and below the chin portion 16b of bezel 16 to facilitate access to the lever portion 20b by a user of mirror assembly 10. Rotation or pivotal movement of lever portion 20b about axis 21 causes rotation of slotted portion 20c of cam actuator 20, which in turn causes end protrusion 26d to slide along arcuate slot 20d and move generally toward and away from the circuit board 30' to pivot attachment plate 28 (and circuit board 30'and prism 14) relative to toggle portion 26 about axis 27 to adjust the position of the prism 14 relative to the mounting assembly 12 and thus relative to the user of the mirror assembly.

Figure 13:
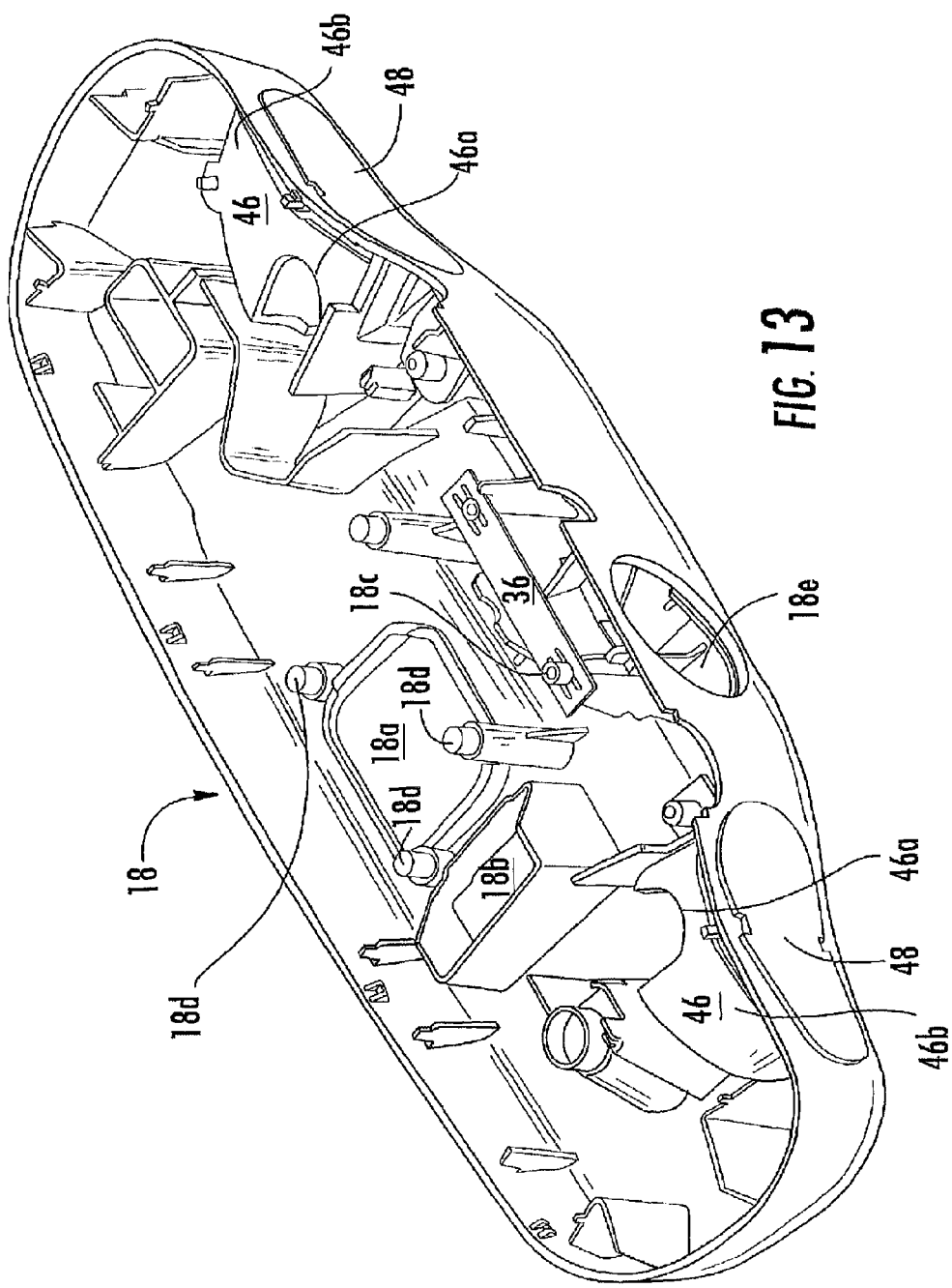
FIG. 13 is a perspective view of a mirror casing suitable for use with the interior rearview mirror assembly of the present invention.
Figure 14:
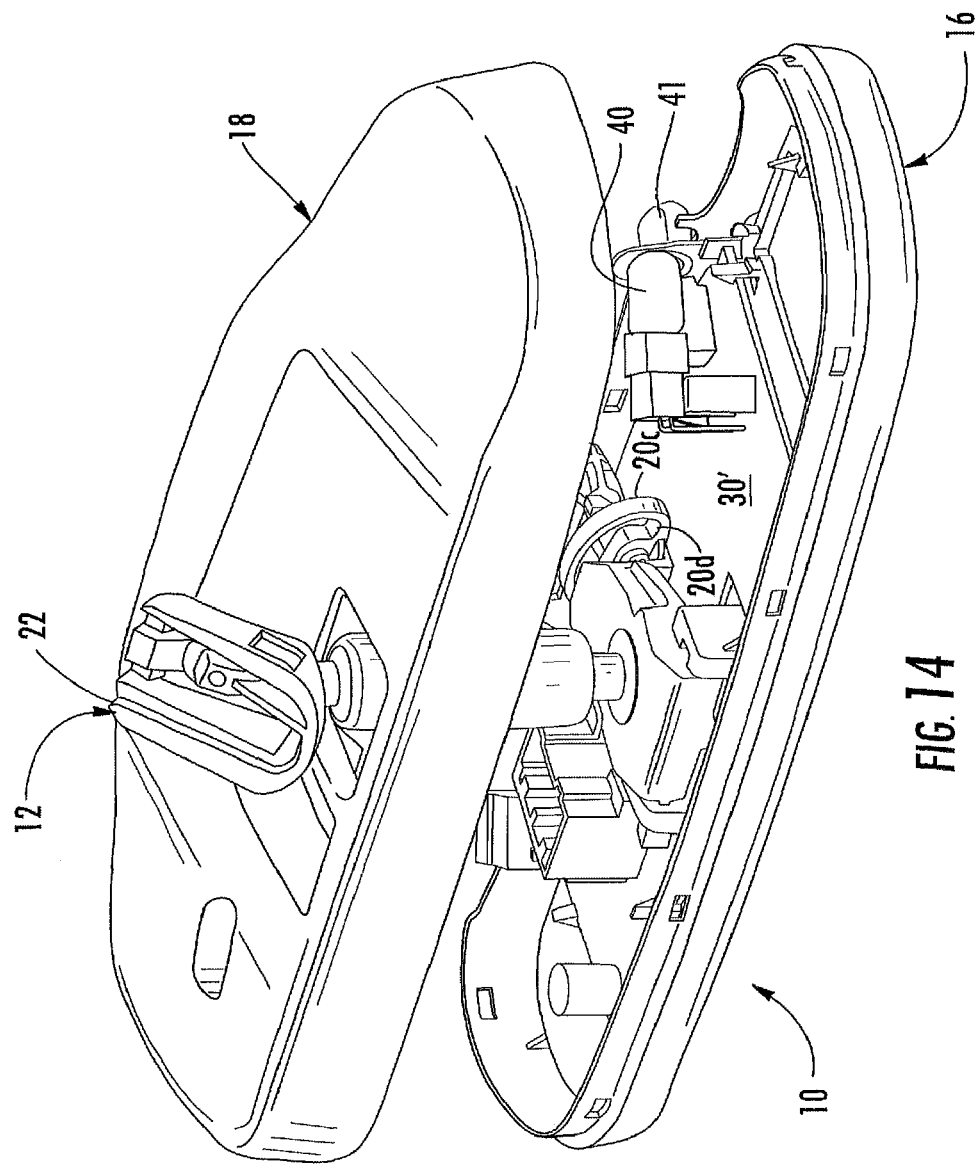
FIG. 14 is a perspective view of the interior rearview mirror assembly, showing the mirror casing being attached to the bezel portion.
Figure 15:
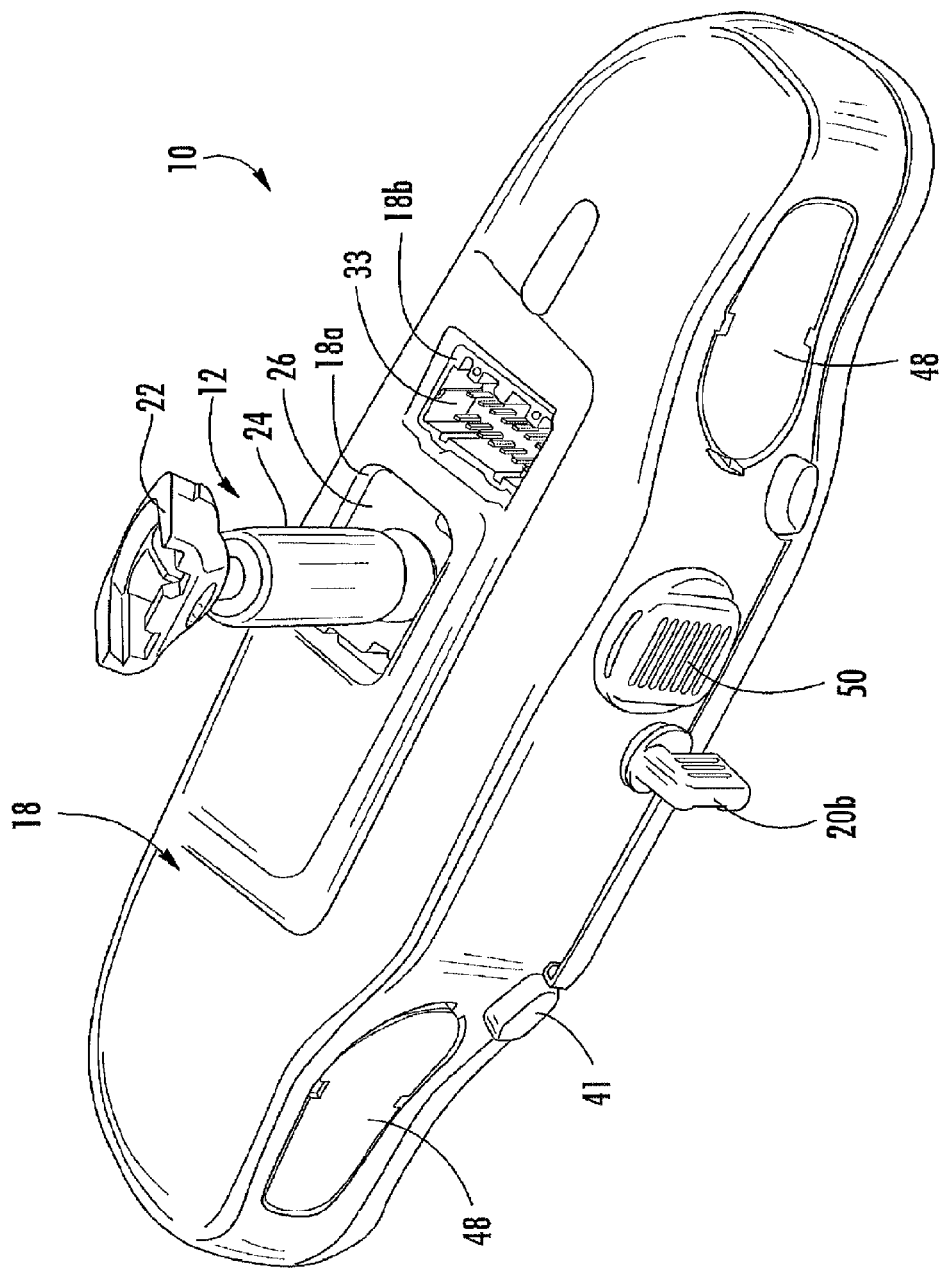
FIG. 15 is a rear perspective view of the assembled interior rearview mirror assembly in accordance with the present invention.

After cam actuator 20 is snapped into or mounted to cam mounting portion 34 of attachment plate 28 and toggle portion 26 is thus properly positioned or oriented at attachment plate 28 and partially over circuit board 30' (as shown in FIG. 12), casing 18 may be attached to bezel portion 16 to contain circuit board 30' and attachment plate 28 within the casing of the mirror assembly. Casing 18 of interior rearview mirror assembly 10 may comprise a unitary or one-piece casing (preferably molded from a thermoplastic resin, such as polypropylene or the like), which may be molded or otherwise formed. As shown in FIG. 13, casing 18 includes an opening 18a therethrough for receiving mounting assembly 12 during the installation process of mirror assembly 10 (as shown in FIG. 14), such that mounting arm 24 extends through opening 18a when mirror assembly 10 is fully assembled. Casing 18 may also have an aperture or receiving structure or opening 18b for guiding and/or securing a plug or connector or wire harness of the vehicle (which typically carries vehicle ignition/battery voltage to the light module, and may carry other signals as may be appropriate for other accessories in the mirror assembly), such as a vehicle wire harness at the headliner of the vehicle, and retaining the connector to the terminals of connector 33 of printed circuit board 30', in order to provide power and/or control to the electronic accessories of circuitry element or circuit board 30' and/or mirror assembly 10. Optionally, casing 16 may comprise a ventilated casing, such as the type disclosed in U.S. Pat. No. 5,673,994, which is hereby incorporated herein by reference.

Casing 18 may also include a leaf spring 36 attached to a pair of posts 18c or the like extending forwardly from the rear casing. The leaf spring 36 engages raised lobe 20e of cam actuator 20 when casing 18 is attached to bezel 16 to bias or urge raised lobe 20e toward one side or the other, which in turn biases or urges cam actuator 20 and toggle portion 26 toward one position or the other to retain the prism in either the daytime or nighttime position until a force is applied to cam actuator that is sufficient to overcome the force applied by leaf spring 36. Casing 18 may also include one or more resilient or compressible members or elements 18d extending forwardly from casing for engaging a surface of printed circuit board 30' to further secure the printed circuit board and attachment plate and prism in place between bezel 16 and casing 18 and to dampen any vibration of the components that may otherwise occur. Likewise, a pair of foam pads 37 may be positioned at the sides of the bezel and reflective element and attachment assembly to dampen vibration and/or reduce light leakage out of the mirror assembly.

The mirror assembly of the present invention thus may be readily assembled by attaching the components to one another along a common attachment axis, thereby substantially easing assembly of the mirror assembly. The mirror assembly may be readily assembled by one or more operators along an assembly line or may be assembled by a robot or machine, since the attachment of the components is along a generally linear and common axis. The components also may readily snap together or otherwise attach to one another to further ease the assembly process. The reflective element, adhesive, keypad, appliqué, and attachment plate may be readily placed or positioned at the bezel portion, and then the circuit board and toggle assembly may be readily attached to the attachment plate, and then the casing may attach to the bezel portion, all via movement of the respective components along a generally common axis or direction.

Figure 22:
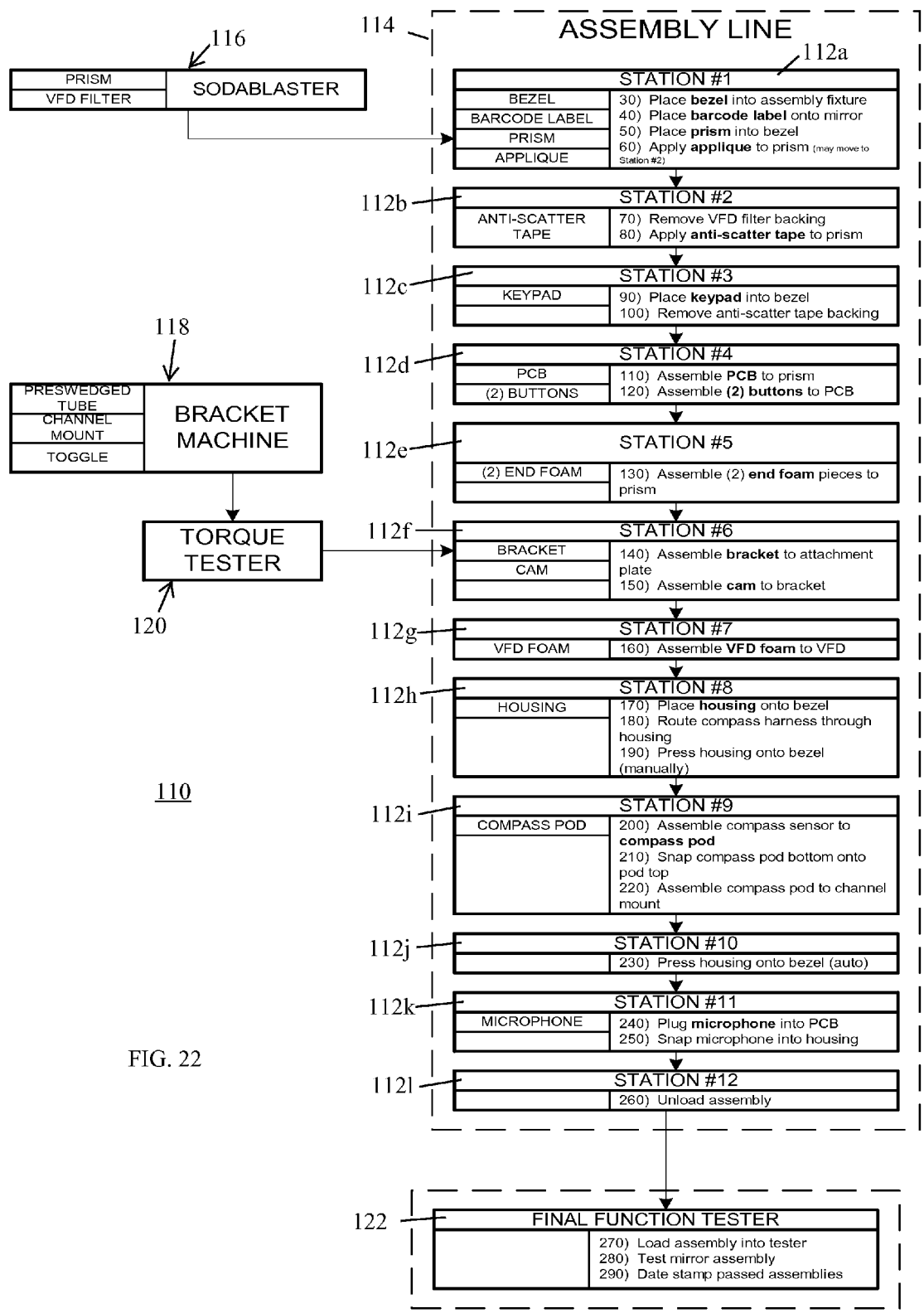
FIG. 22 is a process flow diagram of an assembly process for the mirror assembly in accordance with the present invention.

As shown in FIG. 22, an assembly process 110 for assembling a mirror assembly may include multiple stations 112a-1 along an assembly line 114. The components and partial assemblies of the mirrors may be moved from one station to the next and may be continuously moved along the assembly line or may stop at one or more of the stations. In the illustrated embodiment, a prism is provided and blasted at a prism preparation station 116, where a window or display area in the coating or coatings on the prism is/are mechanically established, such as via sand blasting and/or laser etching or laser ablating the substrate to remove the coatings from the surface of the substrate to form a window or display region in or at the coated substrate (optionally, the window may be otherwise formed, such as via masking the area during the coating of the substrate). A VFD filter may also be applied to the prism at the station 116. The first station 112a along the assembly line 114 includes the steps of placing a bezel into an assembly fixture, placing a barcode label onto the mirror, placing the prism (which may be received from the prism forming and/or cleaning and/or blasting station 116) into the bezel, and applying an appliqué to the prism. The prism and bezel assembly, as held by the assembly fixture, is transferred to the second station 112b, where the VFD filter backing is removed from the prism and an anti-scatter tape or adhesive tape is applied to the back of the prism. The assembly is moved to the third station 112c, where the keypad is placed into the bezel and the backing to the anti-scatter tape is removed to expose the adhesive at the tape. The assembly is moved to the fourth station 112d, where the attachment plate and circuit board are applied to the adhesive tape at the prism and the buttons (if applicable) are attached to the circuit board. The assembly is moved to the fifth station 112e, where the foam pieces are applied to the prism.

The mounting bracket or assembly, which includes the mounting arm or tube, the mounting button and the toggle portion, is formed or assembled at a bracket machine or station 118. The assembled bracket may be tested at a testing station 120 to ensure that the ball and socket joints are properly formed and are within the desired or appropriate torque limits. The assembled bracket and the bezel and reflective element and circuit board assembly are provided to the sixth station 112f. The bracket is assembled to the attachment plate and the cam actuator is assembled to the bracket, and the assembly may be pivoted into the use position along the attachment plate and circuit board. The assembly is moved to the seventh station 112g, where a VFD foam (such as to reduce light leakage) may be applied to the vacuum fluorescent display (VFD) of the mirror assembly.

At the eighth station 112h, the housing or casing is positioned or placed at or onto the bezel, and a compass harness (if applicable) is routed through the housing. After the harness is properly routed through the casing, the casing may be manually pressed onto the bezel. The mirror assembly may be transferred to the ninth station 112i, where a compass sensor or circuitry may be assembled to a compass pod (discussed below) and the compass pod is closed, such as via snapping the bottom of the pod to the top of the pod. The compass pod may be assembled to the mounting button or channel mount. The casing or housing may then be automatically pressed onto the bezel to snap or otherwise attach the casing to the bezel at the tenth station 112j. Optionally, a microphone (also discussed below) may be attached to the PCB and then snapped into the casing or housing at the eleventh station or microphone station 112k, and the completed mirror assembly may be unloaded from the assembly fixture at the twelfth station or unloading station 112l.

The assembly and assembly fixture thus may be moved along an assembly line (and may stop at each station or may be continuously moved along the assembly line) and each component may be readily attached to or snapped to the held assembly along generally the same direction or axis as the assembly is moved from one station to the next. Although shown and described as being assembled in multiple stations along an assembly line, clearly, the mirror assembly of the present invention may be readily assembled at a single station (or two or more stations), where multiple steps may be performed by one or more operators. The mirror assembly and assembly processes of the present invention thus provide for enhanced assembly processes and reduced labor during the assembly of the mirror. Because the assembly processes entail attachment of components along a generally similar or same direction axis, the assembly processes are highly suitable for automation to further reduce the time and labor involved in assembling the mirror assembly. The completed assembly may then be tested at a testing station 122, where the assembly is loaded into a tester, tested, and date stamped if the assembly passes the testing. The completed and tested and approved mirror assembly may then be packaged or transferred to the vehicle assembly plant for assembly or installation into a vehicle.

The mirror assembly may comprise a prismatic mirror assembly, such as a prismatic mirror assembly utilizing aspects described in U.S. Pat. Nos. 6,318,870; 5,327,288; 4,948,242; 4,826,289; 4,436,371; and 4,435,042, and PCT Application No. PCT/US04/015424, filed May 18, 2004 by Donnelly Corporation et al. for MIRROR ASSEMBLY FOR VEHICLE, published Dec. 2, 2004 as PCT Publication No. WO 2004/103772, which are hereby incorporated herein by reference. Optionally, the prismatic reflective element may comprise a conventional prismatic reflective element or prism or may comprise a prismatic reflective element of the types described in PCT Application No. PCT/US03/29776, filed Sep. 19, 2003 by Donnelly Corp. et al. for MIRROR REFLECTIVE ELEMENT ASSEMBLY, published Apr. 1, 2004 as PCT Publication No. WO 2004/026633; U.S. patent application Ser. No. 10/709,434, filed May 5, 2004 by Lynam for MIRROR REFLECTIVE ELEMENT, now U.S. Pat. No. 7,420,756; and U.S. provisional application Ser. No. 60/525,952, filed Nov. 26, 2003 by Lynam for MIRROR REFLECTIVE ELEMENT FOR A VEHICLE, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 6,227,675; 6,229,319; and 6,315,421 (the entire disclosures of which are hereby incorporated by reference herein), that can benefit from the present invention. Optionally, the mirror assembly may comprise an electro-optic or electrochromic reflective element assembly, as discussed below.

The attachment plate may include a ball stud or ball member or ball socket that may be insert molded in or otherwise attached to the attachment plate. The mounting arm or member of the mounting assembly may be snapped onto or may pivotally receive the ball stud (or the mounting arm or member may include a ball member at an end thereof that may be snapped into or be pivotally received in a ball socket at the attachment plate, such as for single ball mounting arrangements or for double ball mounting arms or the like, without affecting the scope of the present invention) to pivotally or adjustably mount the attachment plate and reflective element and printed circuit board to the mounting assembly. The circuit board may be formed or shaped to fit around the ball stud projecting from the attachment plate, such as via one or more openings formed in the circuit board at the area in which the ball stud is positioned. The electro-optic or electrochromic reflective element and the attachment plate and the circuit board thus may be directly mounted to and supported by the mounting assembly, which may provide enhanced vibrational performance of the mirror assembly.

As shown in FIGS. 9-15, interior rearview mirror assembly 10 may include one or more lights or illumination sources 40, such as map reading lights or the like, positioned at the printed circuit board or elsewhere within casing 18 and/or bezel 16 of mirror assembly 10. In the illustrated embodiment, lights 40 are mounted to or attached to the electronic circuitry element or printed circuit board 30' and may be activated or deactivated via pressing one or more user actuatable buttons 41 or the like that may also be attached to printed circuit board 30'. Light source or sources 40 may comprise any type of light source, preferably which provides a bright and cool illumination of the targeted area or areas. Optionally, the light sources may comprise an incandescent light source, a tungsten light source, a xenon light source, a halogen light source or a light emitting diode (LED), such as disclosed in U.S. Pat. No. 6,690,268 and/or in U.S. patent application Ser. No. 10/054,633, filed Jan. 22, 2002 by Lynam et al. for VEHICULAR LIGHTING SYSTEM, now U.S. Pat. No. 7,195,381, which are hereby incorporated herein by reference. Other light sources may be selected (such as a festoon light source, such as the type described in U.S. Pat. No. 5,823,654, which is hereby incorporated herein by reference) and may be selected and combined with a correspondingly selected reflector and/or lens to direct the light toward a targeted area, without affecting the scope of the present invention.

Casing 18 may include a light reflector 46 that may receive a respective light source 40 therein and may reflect or direct illumination from light source 40 generally downwardly toward a targeted area within the cabin of the vehicle, such as a lap area of a driver or passenger of the vehicle. Illumination from light source 40 may be reflected generally downward by reflector 46. Reflector 46 may comprise a vacuum metallized reflector or the like (such as a reflector having a reflective surface with a vacuum metallized coating thereon) to provide a reflective surface for reflecting and directing the light from light source 40 toward the targeted area. Reflector 46 may comprise a highly reflective surface, such as a polished metallic surface or the like. The reflector may be selected or designed to provide a desired light directing prescription, and may work in cooperation with the selected lens prescription, discussed below, to reflect and direct the light in a desired manner. The shape of reflector 46 may be selected depending on the application of the mirror assembly and the location of the light sources and reflectors relative to the targeted areas.

Mirror assembly 10 may include a lens or cover 48, such as a generally transparent lens or the like, at reflector 46. Lens 48 may be configured to shape and direct the light or illumination from light source 40 to the targeted area or areas. Lens 48 may comprise any type of lens or cover as desired, such as a Fresnel lens, such as disclosed in U.S. Pat. No. 6,042,253, which is hereby incorporated herein by reference, or a slightly curved molded plastic body having the general shape of an ellipse, which may be adapted to be scattering (such as by forming a stippled, scattering surface during molding of the lens element itself by providing a stippled surface in the mold cavity) to provide a diffused, translucent appearance, or a diffuse optic, a clear optic, a holographic optic, a binary optic, a sinusoidal optic, a diffractive optic or a tinted optic element or the like, such as disclosed in U.S. Pat. No. 5,669,698, which is hereby incorporated herein by reference. The lens or cover 48 may be removably mounted at casing 18 or at reflector 46 (so as to allow for removal of lens 48 to replace the light source) or may be generally fixedly mounted thereto, and optionally may be molded to the casing or reflector, without affecting the scope of the present invention.

As shown in FIGS. 13 and 18A-D, reflector 46 may include a notch or cutout 46*a* for receiving light source 40 therethrough as the casing is assembled or attached to bezel 16. Notch 46*a* thus may be positioned along a forward surface 46*b* of reflector 46, such that as casing 18 is moved (as shown in FIG. 14) toward and into connection with bezel 16 (to contain the prism, attachment plate, circuitry element or board and lights and the like within the casing and bezel as discussed above), the light source or sources 40 may move through notches 46*a* (which may be generally aligned with the position of the light sources on the circuit board) and into position generally within reflectors 46. The reflectors and notches thus substantially enhance the assembly process of the mirror assembly, because the light sources then do not have to be carefully inserted through small openings at the top of the reflectors before the casing is attached to the bezel, and because the reflectors do not have to be inserted through openings in the casing and around the light sources (via an opening in the top portion of the reflector) after the casing is attached to the bezel. The present invention thus may eliminate an assembly process by positioning the light sources within the reflectors as the casing is positioned at and connected to the bezel.

Figure 19:
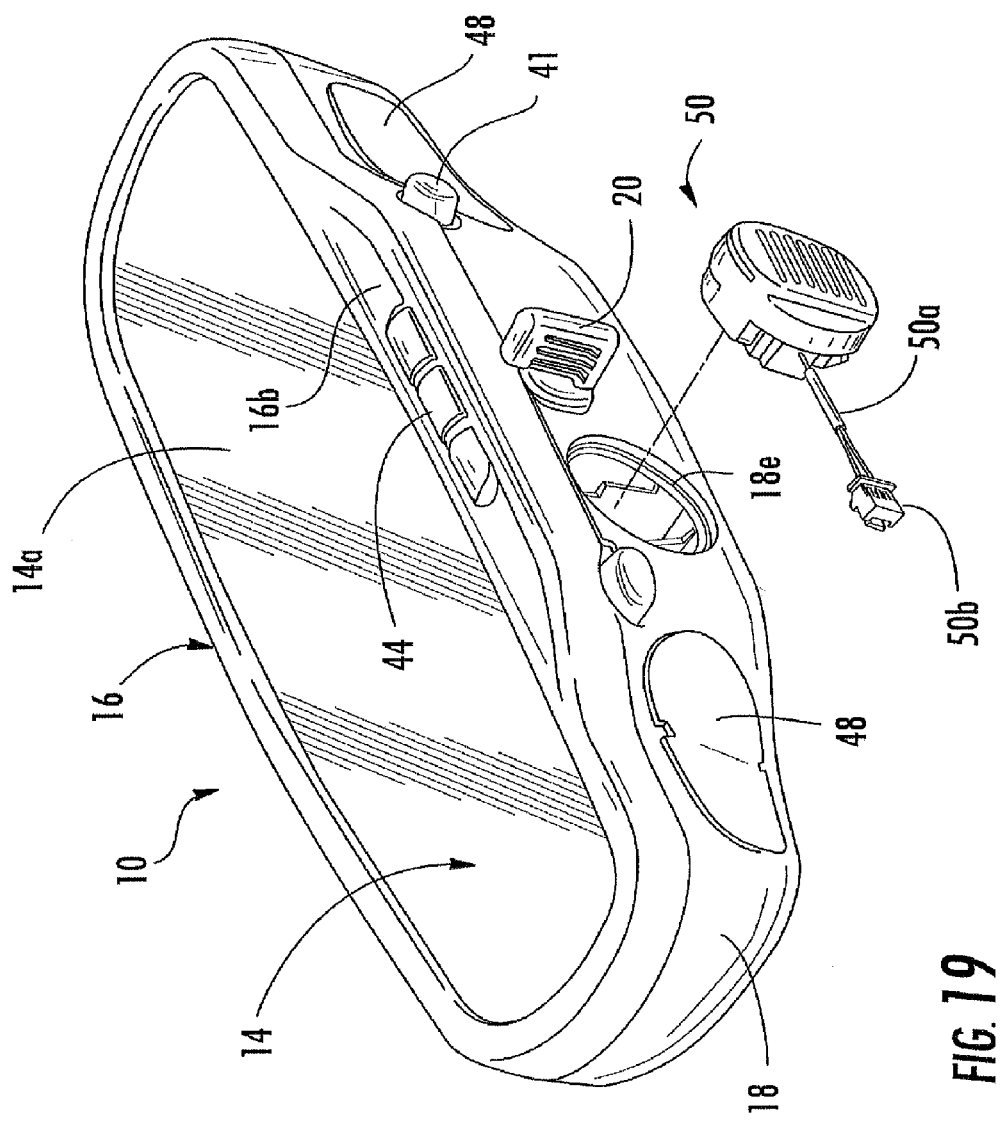
FIG. 19 is a front perspective view of the interior rearview mirror assembly of the present invention, with a microphone device being inserted into a corresponding opening in the mirror casing.

Optionally, mirror assembly 10 may include a microphone 50 (FIGS. 15 and 19), which may include an electrical wire 50*a* and connector 50*b* extending therefrom for connecting the microphone to a corresponding connector 51 on the circuit board 30'. Microphone 50 may be inserted through an opening 18*e* in casing 18 and secured therein, such as via snap clasps or retention arms or the like around the microphone and/or opening. Microphone 50 may be implemented in connection with a communication system or telematics system or the like, and may be implemented in connection with a system of the types disclosed in U.S. Pat. Nos. 6,243,003; 6,278,377; and/or 6,420,975, which are hereby incorporated herein by reference. Optionally, the microphone may include aspects of the microphones and systems described in PCT Application No. PCT/US03/030877, filed Oct. 1, 2003, and published Apr. 15, 2004 as International Publication No. WO 2004/032568 A1, which is hereby incorporated herein by reference.

Although shown and described as being attached to the bezel to contain the circuit board, attachment plate, reflective element and accessories therein, it is envisioned that the mirror casing may optionally utilize aspects of the mirror casings and/or mirror assemblies described in PCT Application No. PCT/US04/015424, filed May 18, 2004, published Dec. 2, 2004 as PCT Publication No. WO 2004/103772, which is hereby incorporated herein by reference.

Figure 20:
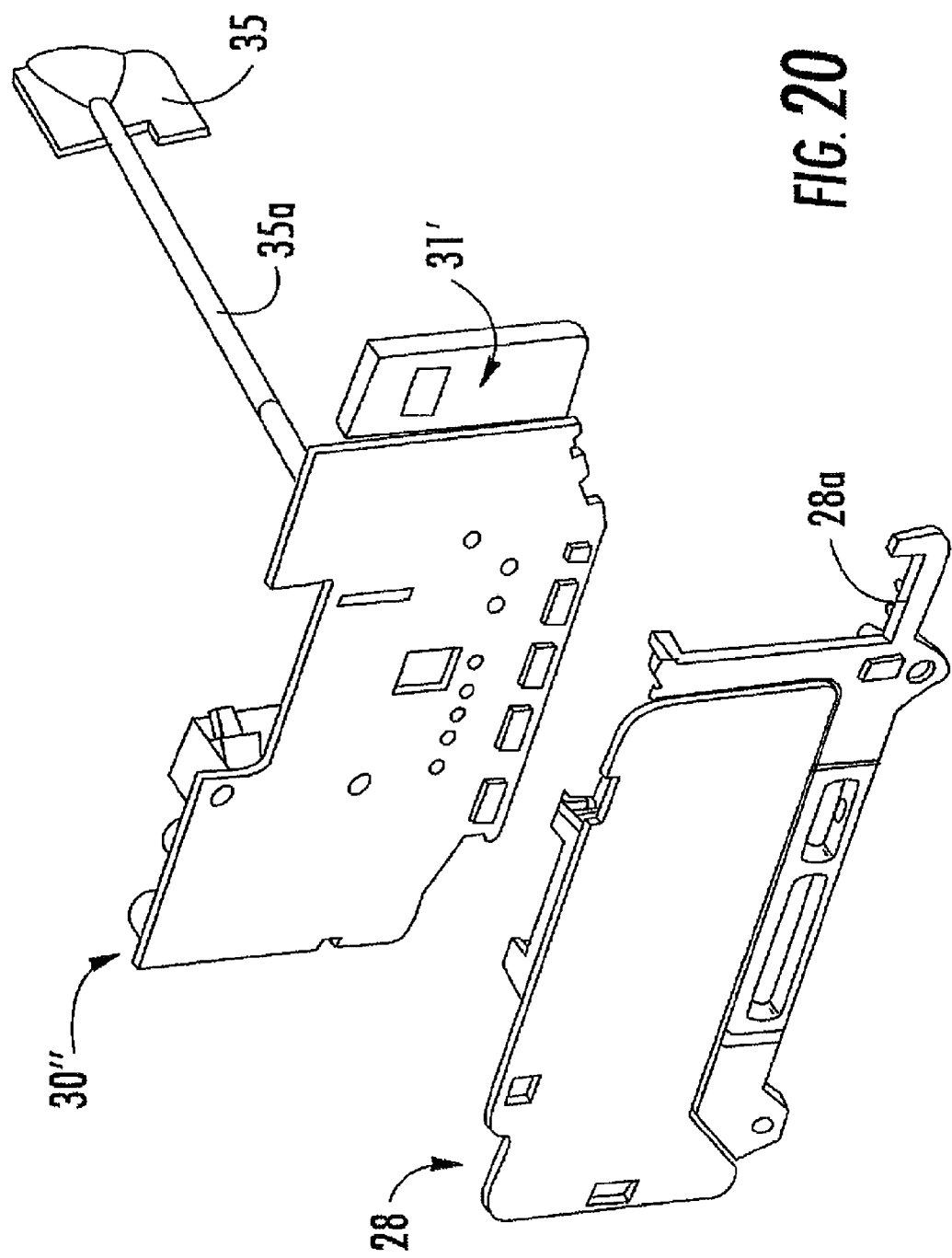
FIG. 20 is a perspective view of another printed circuit board and attachment plate in accordance with the present invention, with the circuit board including a compass board connected thereto.
Figure 21B:
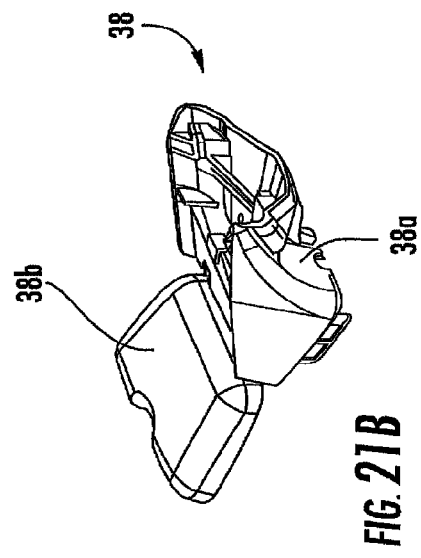
FIGS. 21A-D are views of a compass pod for holding the compass circuit board of FIG. 20 and mounting or attaching to a mounting base in accordance with the present invention.
Figure 21D:
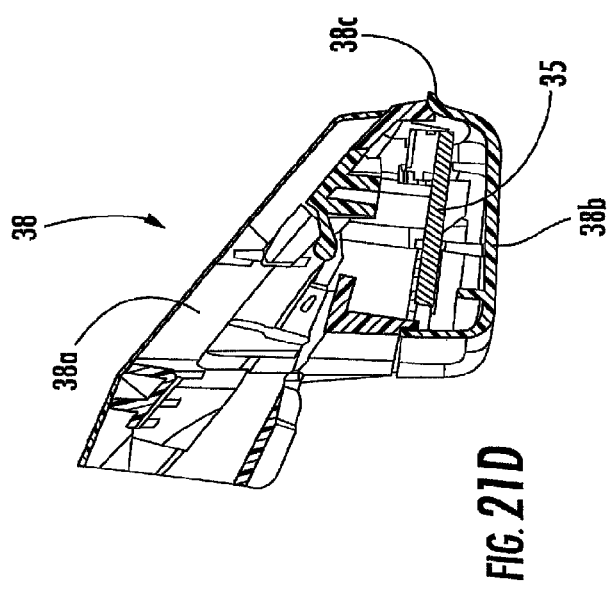
Figure 21A:
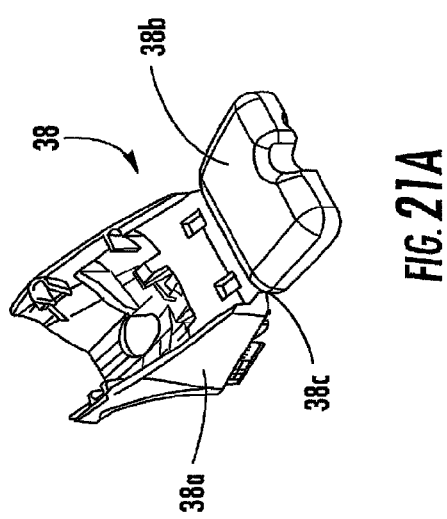
Figure 21C:
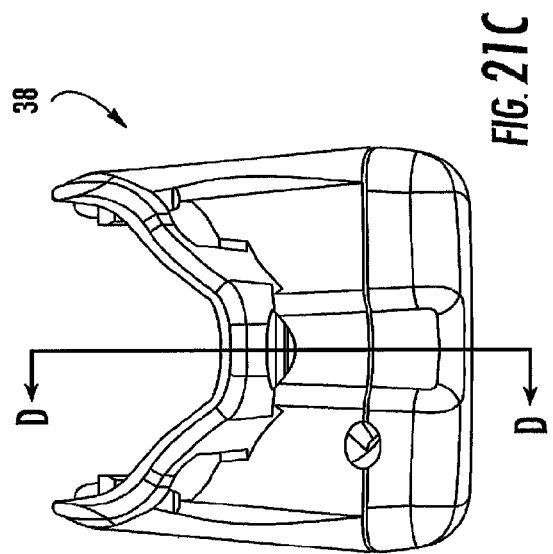

Optionally, if the electronic circuitry element or circuitry board or printed circuit board, such as printed circuit board 30" (FIG. 20), includes a compass display 31', printed circuit board 30" may include a compass circuitry element or circuit board 35 attached to an end of an electrical wire or wires 35*a* (FIG. 20). The compass circuit board 35 may include the compass sensors and circuitry and may be positioned remote from the printed circuit board 30", such as at an accessory pod or compass pod or module 38 (FIGS. 21A-D) fixedly attached to the mounting base 22 of mounting assembly 12 or to a portion of the vehicle. By fixedly positioning the compass circuitry or circuit board 35 in such a manner, the sensors and circuitry may not be adversely affected by adjustments made to the mirror by a driver or occupant of the vehicle. Such a compass circuit board 35 and printed circuit board 30" of interior rearview mirror assembly 10 may comprise any type of compass circuitry and sensors and displays, such as compass circuitry, sensors and/or displays of the types disclosed in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851; and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; and/or European patent application published Oct. 11, 2000 under Publication No. EP 0 1043566, which are all hereby incorporated herein by reference.

As shown in FIGS. 21A-D, compass pod 38 for holding or housing the compass circuit board 35 and associated sensors or circuitry may comprise a unitarily formed pod or module that may snap or otherwise readily mount or attach to the mounting base of the mounting assembly of mirror assembly 10. Compass pod 38 may include a body portion 38*a* and a cover portion 38*b* that are joined together along a living hinge 38*c* (such as is known in the art and such as can be established via molding from a polymeric material, such as a polyolefin polymeric material, such as a polypropylene and/or polyethylene polymeric resinous material). Body portion 38*a* may receive compass circuit board 35 therein, and may generally retain the circuit board via snap clasps or the like that may engage the edge or edges of the circuit board. Cover portion 38*b* may then fold over body portion 38*a* and compass circuit board 35 and may snap or otherwise connect or secure to body portion 38*a* to contain compass circuit board 35 within compass pod 38. Body portion 38*a* may be formed to snap or fit over the mounting base to fixedly position or attach compass pod 38 at or to the mounting base of the mounting assembly, while wire 35*a* may extend through an opening in body portion 38*a* or cover portion 38*b* and may extend along the mounting arm and through an opening (such as opening 18*a*) in mirror casing 18 to the printed circuit board 30" within casing 18 of mirror assembly 10. The accessory pod may also or otherwise house or contain circuitry for other accessories, without affecting the scope of the present invention.

Figure 23:
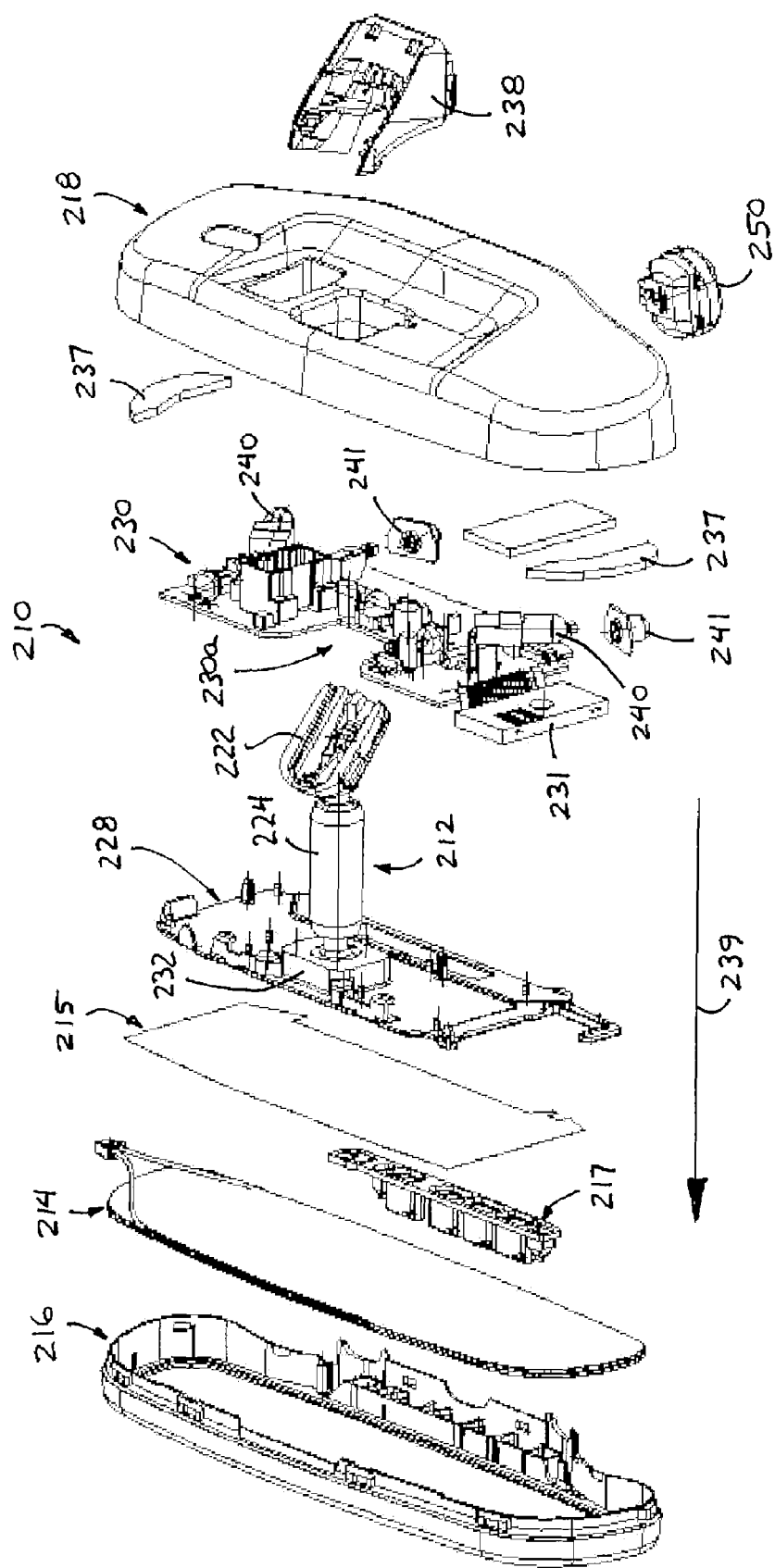
FIG. 23 is an exploded perspective view of another mirror assembly in accordance with the present invention.

Although shown and described as comprising a prismatic reflective element, it is envisioned that the interior rearview mirror assembly of the present invention may comprise an electro-optic or electrochromic reflective element or cell (such as shown in FIG. 23 and discussed below), such as an electrochromic mirror assembly and electrochromic element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, which are hereby incorporated herein by reference, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein. The mirror assembly may include one or more displays, such as the types disclosed in U.S. Pat. Nos. 5,530, 240 and/or 6,329,925, which are hereby incorporated herein by reference, and/or display-on-demand or transflective type displays, such as the types disclosed in U.S. Pat. Nos. 6,690, 268; 5,668,663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; PCT Application No. PCT/US03/29776, filed Sep. 9, 2003 by Donnelly Corp. et al. for MIRROR REFLECTIVE ELEMENT ASSEMBLY, published Apr. 1, 2004 as PCT Publication No. WO 2004/026633; and/or PCT Application No. PCT/US03/40611, filed Dec. 19, 2003 by Donnelly Corp. et al. for ACCESSORY SYSTEM FOR VEHICLE, published Jul. 15, 2004 as PCT Publication No. WO 2004/058540, which are all hereby incorporated herein by reference, For example, and with reference to FIGS. 23 and 24, an electro-optic mirror assembly 210 may include similar components as prismatic mirror assembly 10, discussed above, and may be assembled generally along a common axis 239 to provide a substantially enhanced assembly process. The electro-optic mirror assembly 210 includes an electro-optic or electrochromic reflective element assembly 214 and associated circuitry on the electronic circuitry element or circuitry board or printed circuit board 230, but may otherwise be substantially similar to prismatic mirror assembly 10 such that a detailed discussion of the components of the mirror assemblies will not be repeated herein. The common or similar components are shown in FIG. 23 with 200 added to the reference number for the common/similar components of mirror assembly 10.

Electro-optic minor assembly 210 includes a bezel portion 216, which receives the reflective element assembly 214 during the assembly process (discussed below with respect to FIG. 24). The attachment plate 228 is attached to the reflective element assembly 214 via an adhesive tape or anti-scatter tape 215. Attachment plate 228 includes a mounting portion or socket 232, which pivotally receives a ball member of the mounting arm 224 to pivotally attach the attachment plate 228 to the mounting arm 224 of mounting assembly 212. The circuit board 230 includes a cutout or notch 230a for receiving mounting portion 232 at least partially therethrough so that mounting assembly 212 protrudes at least partially through circuit board 230 when circuit board 230 is attached or snapped to attachment plate 228. The circuit board 230 also includes a connector or plug or socket for electrically connecting to or receiving a connector or lead or plug 214a of electrochromic reflective element assembly or cell 214. The casing or housing 218 is attached to bezel portion 216 to contain the components within the mirror assembly, with the mounting arm 224 and channel mount or mounting base 222 extending from the mirror assembly for attachment to the accessory pod 238 and mounting button (not shown) at the interior portion of the vehicle, such as at the windshield of the vehicle.

Figure 24:
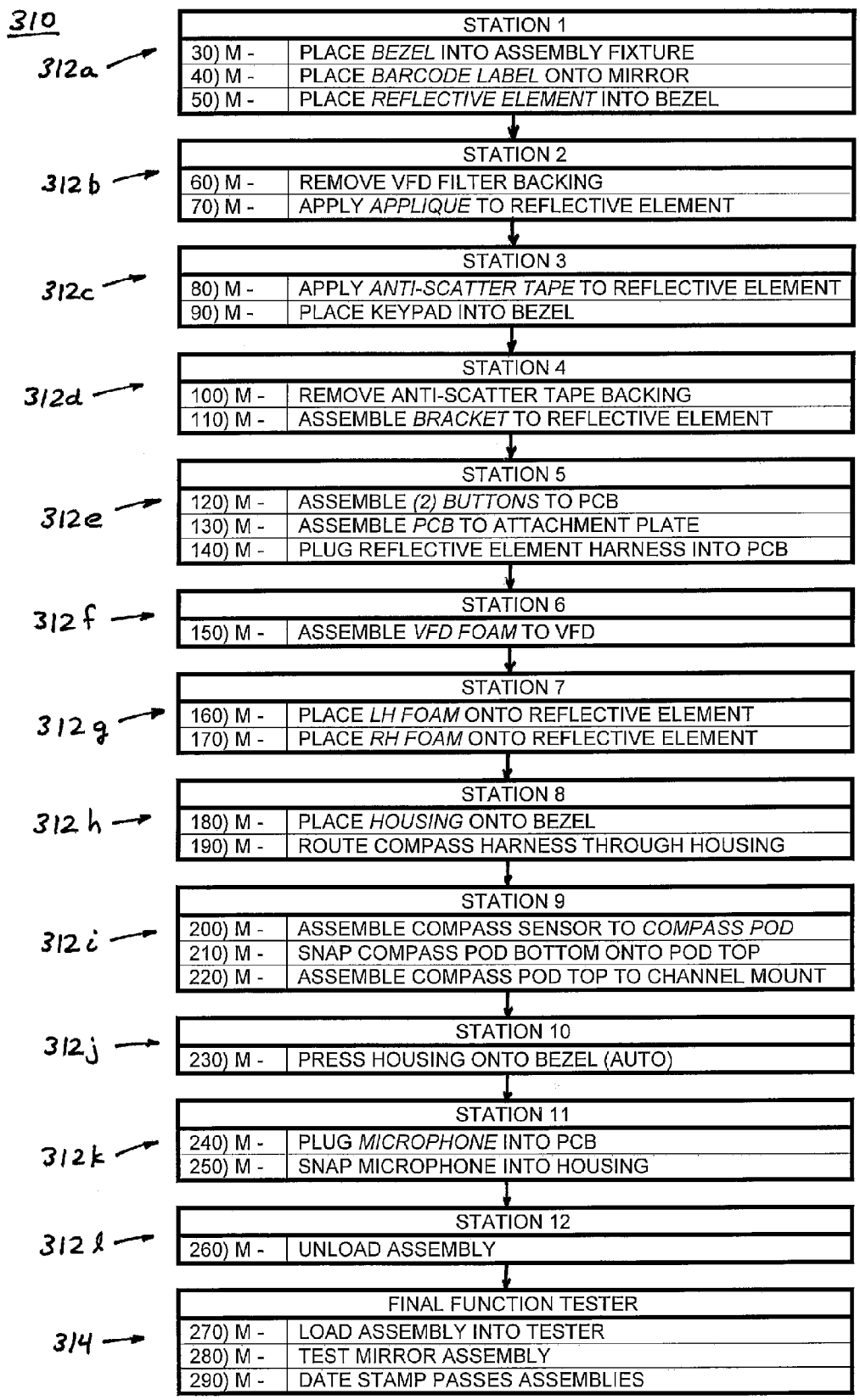
FIG. 24 is a process flow diagram of an assembly process for the mirror assembly of FIG. 23.

As shown in FIG. 24, an assembly process 310 for assembling the electro-optic minor assembly 210 includes multiple stations 312a-1 along an assembly line. The components and partial assemblies of the minors may be moved from one station to the next and may be continuously moved along the assembly line or may stop at one or more of the stations (or multiple steps may be performed by one or more operators at one or more stations). In the illustrated embodiment, the first station 312a includes the steps of placing a bezel into an assembly fixture, placing a barcode label onto the mirror, and placing the electro-optic or electrochromic cell or reflective element assembly into the bezel. The reflective element and bezel assembly, as held by the assembly fixture, is transferred to the second station 312b, where the VFD filter backing is removed from the reflective element and an appliqué is applied to the reflective element. The assembly is moved to the third station 312c, where the anti-scatter tape or adhesive tape is applied to the back of the reflective element, and the keypad is placed into the bezel. The assembly is moved to the fourth station 312d, where the backing to the anti-scatter tape is removed to expose the adhesive at the tape, and the mounting bracket or assembly (which includes the mounting arm or tube and the channel mount or mounting base, and which may be formed or assembled at a bracket machine or station and tested, such as described above) and attachment plate are assembled to the reflective element by applying the attachment plate to the adhesive tape at the reflective element. The assembly is moved to the fifth station 312e, where the buttons or inputs are assembled to the circuit board and the circuit board is assembled or snapped to the attachment plate. The cell harness 214a is plugged into or connected to the appropriate connector at the circuit board.

The assembly is moved to the sixth station 312f, where the VFD foam is assembled or applied to the VFD display. The assembly is moved to the seventh station 312g, where the left and right foam pieces are applied to the reflective element. The assembled bracket and the bezel and reflective element and circuit board assembly are provided to the eighth station 312h, where the housing or casing is positioned or placed at or onto the bezel, and a compass harness (if applicable) is routed through the housing. The mirror assembly may be transferred to the ninth station 312i, where the compass sensor or circuitry (if applicable) may be assembled to a compass pod and the compass pod is closed, such as via snapping the bottom of the pod to the top of the pod. The compass pod may be assembled to the mounting base or channel mount. The casing or housing may then be automatically pressed onto the bezel to snap or otherwise attach the casing to the bezel at the tenth station 312j. Optionally, a microphone (if applicable) may be attached to the circuit board and then snapped into the casing or housing at the eleventh station 312k, and the completed mirror assembly may be unloaded from the assembly fixture at the twelfth station 312l. The assembly may be tested at a testing station 314, where the completed mirror assembly is loaded into a tester, tested, and date stamped if the assembly passes the tests. The completed and tested and approved mirror assembly may then be packaged or transferred to the vehicle assembly plant for assembly or installation into a vehicle.

The assembly and assembly fixture thus may be moved along an assembly line (and may stop at each station or may be continuously moved along the assembly line) and/or may be assembled at one or more stations by one or more operators, and each component may be readily attached to or snapped to the held assembly along generally the same direction or axis as the assembly is moved from one station to the next or as an operator performs multiple steps of the assembly process. The mirror assembly and assembly processes of the present invention thus provide for enhanced assembly processes and reduced labor during the assembly of the electro-optic or electrochromic mirror assembly. Because the assembly processes entail attachment of components along a generally similar or same direction axis, the assembly process is highly suitable for automation to further reduce the time and labor involved in assembling the mirror assembly.

Optionally, the electronic circuitry element or circuitry board or printed circuit board of the mirror assembly of the present invention may include another display element along or partially along an edge of the board and may include one or more user-actuatable controls or buttons near or adjacent to the display element. The display element may be any type of display, such as a vacuum fluorescent (VF) display, a light emitting diode (LED) display, an electroluminescent (EL) display, a liquid crystal display (LCD), a video screen display or the like, and may be operable to display various information (as discrete characters, icons or the like, or in a multi-pixel manner) to the driver of the vehicle, such as passenger side inflatable restraint (PSIR) information, tire pressure status, and/or the like.

The user inputs or buttons may be for actuating or controlling various accessories or controls or components associated with the vehicle, such as for a compass calibration setting or zone setting, a telematics actuation, a garage door opener, an electronic toll control (such as disclosed in U.S. Pat. No. 6,690,268, which is hereby incorporated herein by reference), and/or the like, or may be for switching the display between various functions or modes, without affecting the scope of the present invention. Optionally, the user inputs may comprise touch sensors or proximity sensing inputs or the like, such as sensors of the types described in U.S. Pat. Nos. 6,001,486; 6,310,611; 6,320,282; 6,627,918; and 5,594,222; and/or U.S. Pat. Publication No. 2002/0044065, published Apr. 18, 2002 by Quist et al. for INTERACTIVE AUTOMOTIVE REARVISION SYSTEM, now U.S. Pat. No. 7,224,324; and/or PCT Application No. PCT/US03/40611, filed Dec. 19, 2003 by Donnelly Corp. et al. for ACCESSORY SYSTEM FOR VEHICLE, published Jul. 15, 2004 as PCT Publication No. WO 2004/058540; and/or U.S. provisional application Ser. No. 60/508,086, filed Oct. 2, 2003 by Schofield for MIRROR REFLECTIVE ELEMENT ASSEMBLY INCLUDING ELECTRONIC COMPONENT, which are all hereby incorporated herein by reference, or may comprise inputs molded within the bezel of the mirror assembly, such as described in U.S. provisional applications Ser. No. 60/535,559, filed Jan. 9, 2004 by Lindahl for MIRROR ASSEMBLY; and/or Ser. No. 60/553,517, filed Mar. 16, 2004 by Lindahl et al. for MIRROR ASSEMBLY, which are hereby incorporated herein by reference, or may comprise membrane type switches, such as described in U.S. provisional application Ser. No. 60/575,904, filed Jun. 1, 2004 by Uken for MIRROR ASSEMBLY FOR VEHICLE, which is hereby incorporated herein by reference; and/or the like, without affecting the scope of the present invention.

Optionally, for example, the user inputs may comprise proximity sensing inputs and the circuitry or controls may be operable to activate/deactivate/toggle/control an accessory in response to a detection of a user's finger or the like approaching the input or button region at the mirror assembly. Because such inputs may be individual or separate proximity sensors or antennae positioned within the mirror assembly and not readily viewable or discernable by the driver or occupant of the vehicle, the mirror assembly may include a display or indicator that indicates the function of each input. Preferably, the mirror assembly may include a control or circuitry that selectively or occasionally activates a display to temporarily display the feature or function or accessory associated with the particular input or input region of the mirror assembly, such as in response to the user's finger or the like approaching the input area or the like. For example, it is further envisioned that when a user's finger is first detected as it approaches the input region (such as when the user's finger or the like is within a first threshold distance from one of the sensors, such as within about ¼ or ½ of an inch or thereabouts), the control or circuitry may activate a display (such as a display on demand type of display or transflective display that is viewable through the reflective element of the mirror assembly, such as described in U.S. Pat. Nos. 6,690,268; 5,668,663 and/or 5,724,187; and/or in U.S. patent application Ser. No. 10/054,633, filed Jan. 22, 2002 by Lynam et al. for VEHICULAR LIGHTING SYSTEM, now U.S. Pat. No. 7,195,381; PCT Application No. PCT/US03/29776, filed Sep. 9, 2003 by Donnelly Corp. et al. for MIRROR REFLECTIVE ELEMENT ASSEMBLY, published Apr. 1, 2004 as PCT Publication No. WO 2004/026633; and/or PCT Application No. PCT/US03/40611, filed Dec. 19, 2003 by Donnelly Corp. et al. for ACCESSORY SYSTEM FOR VEHICLE, published Jul. 15, 2004 as PCT Publication No. WO 2004/058540, which are all hereby incorporated herein by reference) that indicates the accessory or feature or function associated with at least some or all of the inputs along the bezel or other region of the mirror assembly. The display may list or indicate the features (such as via text or icons or other indicia) at areas of the reflective element that are near to or generally adjacent to the respective inputs or input regions.

When the user then moves his or her finger to touch or contact the desired or appropriate input (or may move the finger closer to the input region or sensor, such as within a second threshold distance from the sensor that is smaller than the first threshold distance), such as at the bezel or the like, whereby the detection of the contact (or of a closer proximity of the finger) may cause the control to activate/deactivate or toggle/adjust or control the accessory or feature or function associated with that input or input region. As the user's finger is moved closer to or contacts the selected input region, the displays for the other inputs may deactivate so that only the display for the selected input remains viewable by the user. Optionally, the detection of the closer proximity (such as within the second threshold distance or touching) may cause other menus or the like to appear at the mirror assembly, whereby the user may toggle or scroll through the menus to accomplish the desired task or activate/deactivate/adjust the desired or appropriate accessory or function or feature. The user thus may activate/deactivate/toggle/adjust/control the accessory or function or feature associated with the selected input or may scroll through a menu shown in the display at the reflective element.

Optionally, it is envisioned that the control or circuitry may initially activate a display element or display device associated with one of the inputs or buttons or sensor regions, such that as the user's finger approaches a particular input or button or sensor region (such as when the user's finger is within a threshold distance of the input, such as within approximately ¼ or ½ inches or thereabouts of the input or input region), the control or circuitry may activate the respective display that indicates the accessory or feature or function associated with that particular input or input region or sensor. The user thus may move their finger along the front of the mirror assembly (and over and along the separate/distinct sensors or input regions) and view the display or information for the accessory or feature or function associated with each region or input. When the user's finger is located at the desired function, the user may then contact the input region (or may move the finger closer to the input region or sensor), whereby the detection of the contact (or of a closer proximity of the finger) may cause the control to activate/deactivate or toggle/adjust or control the accessory or feature or function associated with that input or input region, or may cause other menus or the like to appear at the mirror assembly, such as described above.

Optionally, the printed circuit board, or the mirror assembly (or a compass pod or module or an accessory module associated with the mirror assembly), may include other accessories, such as a rain sensor (such as the type disclosed in commonly assigned U.S. Pat. Nos. 6,320,176; 6,353,392 and 6,313,454, which are hereby incorporated herein by reference), an image sensor (such as a video camera or imaging sensor, such as a CMOS imaging array sensor, a CCD sensor or the like, such as the types disclosed in commonly assigned, U.S. Pat. Nos. 5,550,677; 6,097,023 and 5,796,094, which are hereby incorporated herein by reference), a temperature sensor (such as a contact temperature sensor for measuring the temperature at or of the windshield), an antenna, or any other sensor or device. For example, the mirror assembly may include a forward facing video image sensor or system, which may include an intelligent rain sensor (such as the type disclosed in commonly assigned U.S. Pat. Nos. 6,320,176; 6,353,392 and 6,313,454, which are hereby incorporated herein by reference), an image or vision system (including an imaging sensor, such as a video camera, such as a CMOS imaging array sensor, a CCD sensor or the like, such as the types disclosed in commonly assigned, U.S. Pat. Nos. 5,550,677; 6,097,023 and 5,796,094, and U.S. patent application Ser. No. 10/422,378, filed Apr. 24, 2003 by Schofield for IMAGING SYSTEM FOR VEHICLE, now U.S. Pat. No. 6,946,978, which are hereby incorporated herein by reference), an intelligent headlamp controller (such as the type disclosed in U.S. Pat. No. 5,796,094 and/or in U.S. patent application Ser. No. 10/355,454, filed Jan. 31, 2003 by Schofield et al. for VEHICLE ACCESSORY MODULE, now U.S. Pat. No. 6,824,281, which are hereby incorporated herein by reference), an intelligent lane departure warning system or object detection system, such as the type disclosed in U.S. pat. application Ser. No. 10/427,051, filed Apr. 30, 2003 by Pawlicki et al. for OBJECT DETECTION SYSTEM FOR VEHICLE, now U.S. Pat. No. 7,038,577, which is hereby incorporated herein by reference, and/or the like. The imaging sensor and/or control circuitry of the mirror assembly may be incorporated into or operable in conjunction with a vision system or imaging system of the vehicle, such as a rearwardly directed vehicle vision system utilizing principles disclosed in U.S. Pat, Nos. 5,550,677; 5,760,962; 5,670,935; 6,201,642; 6,717,610; and/or 6,757,109, which are hereby incorporated herein by reference, a trailer hitching aid or tow check system, such as the type disclosed in U.S. patent application Ser. No. 10/418,486, filed Apr. 18, 2003 by McMahon et al. for VEHICLE IMAGING SYSTEM, now U.S. Pat. No. 7,005,974, which is hereby incorporated herein by reference, a cabin viewing device or system, such as a baby viewing or rear seat viewing camera or device or system or the like, such as disclosed in U.S. Pat. Nos. 5,877,897 and 6,690,268, which are hereby incorporated herein by reference, a video communication device or system, such as disclosed in U.S. Pat. No. 6,690,268, which is hereby incorporated herein by reference, and/or the like.

Optionally, the mirror assembly of the present invention may include one or more displays, such as a text display, an icon display, a display on demand type display (such as may be implemented with a transflective reflective element, such as described in U.S. Pat. Nos. 5,668,663; 5,724,187; and 6,690,268, which are hereby incorporated by reference herein), such as a video or touch screen interface display, or the like, and/or one or more sensors or other accessories, such as a biometric imager, such as for fingerprint authentication or the like, an infrared sensor, such as a zonal temperature sensor, such as suitable for an auto climate control, a forward facing image sensor, such as described above, a rearward facing image sensor (such as for biometric imaging (such as for face recognition, iris recognition or the like), seat height or position detection, drowsiness detection, safety/restraints object detection and position, emergency response image capture system, intrusion detection or the like), and/or an electronic field sensor (such as the type disclosed in commonly assigned U.S. Pat. No. 6,768,420, which is hereby incorporated herein by reference). The display and/or accessories may be associated with a communication system, a speaker, a telematics module (which may include a GPS module, a wireless communication module, a human/machine interface (HMI), a display, such as an LED display, a dot matrix display, an alpha numeric display, a video display or the like, and/or a microphone, which may be operable for speech or voice recognition, noise reduction or noise cancellation), a humidity sensor, a remote keyless entry sensor, a tire pressure monitoring system (TPMS), an electronic toll collection sensor, an intelligent headlamp control, user interface controls (such as buttons, switches or the like for controlling various accessories of the vehicle, such as a sunroof, a communication system, lamps, security systems, displays or the like) or any other accessories, sensors, lights, indicators, displays or the like which may be suitable for mounting or positioning at or within the interior rearview mirror assembly or an accessory module. The interior rearview minor assembly and/or compass or accessory module may also provide for glare reduction characteristics of the reflective element of the rearview mirror assembly. Optionally, the interior mirror assembly of the present invention and/or an accessory module or console or the like of the vehicle may include a hard disc drive (HDD) electronic mass storage device, and preferably a HDD microdrive, such as a one-inch (or smaller) HDD, such as are developed by Hitachi Global Storage Technologies, Inc. (HGST) of the United States, Hoya Corp. of Japan, and Seagate Technology LLC.

Optionally, the mirror assembly may include or may be associated with other accessories, such as one or more electrical or electronic devices or accessories, such as antennas, including global positioning system (GPS) or cellular phone antennas, such as the type disclosed in U.S. Pat. No. 5,971,552, a communication module, such as the type disclosed in U.S. Pat. No. 5,798,688, a voice recorder, a digital network, such as the type described in U.S. Pat. No. 5,798,575, transmitters and/or receivers, such as a garage door opener or the like, such as the types described in U.S. patent application Ser. No. 10/770,736, filed Feb. 3, 2004 by Baumgardner et al. for GARAGE DOOR OPENING SYSTEM FOR VEHICLE, now U.S. Pat. No. 7,023,322, and/or U.S. Pat. Nos. 6,396, 408; 6,362,771; and 5,798,688 (and may provide a storage compartment, such as for storing a hand held garage door opening device or transmitting device or the like), a digital network, such as the type described in U.S. Pat. No. 5,798, 575, a memory mirror system, such as the type disclosed in U.S. Pat. No. 5,796,176, a hands-free phone attachment, a video device for internal cabin surveillance and/or video telephone function, such as the types disclosed in U.S. Pat. Nos. 5,760,962 and/or 5,877,897, a remote keyless entry receiver, a video mirror system, such as the types disclosed in commonly assigned U.S. Pat. Nos. 6,690,268; 6,428,172 and 6,420,975, and U.S. patent application Ser. No. 09/585,379, filed Jun. 1, 2000 for REARVIEW MIRROR ASSEMBLY WITH UTILITY FUNCTIONS; and Ser. No. 10/307,929, filed Dec. 2, 2002 by Hutzel et al. for AN INTERIOR REARVIEW MIRROR SYSTEM INCLUDING A PENDENT ACCESSORY, now U.S. Pat. No. 6,902,284, lights, such as map reading lights or one or more other lights or illumination sources, such as the types disclosed in U.S. Pat. Nos. 5,938, 321; 5,813,745; 5,820,245; 5,673,994; 5,649,756; 5,178,448; 5,671,996; 4,646,210; 4,733,336; 4,807,096; 6,690,268; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381, microphones, such as the types disclosed in U.S. Pat. Nos. 6,243,003; 6,278,377; and/or 6,420,975, and/or PCT Application No. PCT/US03/30877, filed Oct. 1, 2003, published Apr. 15, 2004 as PCT Publication No. WO 2004/ 032568, speakers, a compass or compass system (which may include the compass sensing circuitry), such as the types disclosed in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, a navigation system, such as the types described in U.S. Pat. Nos. 6,678, 614 and 6,477,464, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978, a tire pressure monitoring system, such as the types disclosed in U.S. Pat. Nos. 6,294,989; 6,445,287; and/or 6,472,979, a seat occupancy detector, a trip computer, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions), a telematics system, such as an ONSTAR® system or the like, and/or any other desired accessory or system or the like (with all of the above-referenced patents and patent applications and PCT applications being commonly assigned to Donnelly Corporation, and with the disclosures of all of the above referenced patents and patent applications and PCT applications being hereby incorporated herein by reference in their entireties).

Optionally, the mirror assembly may include a display element, such as a video display element or the like, that may be viewable by a driver or occupant of the vehicle, such as to view vehicle information or captured images, such as images captured by an imaging system of the vehicle. For example, the display element may slide out or flip up or down from the housing or casing of the mirror assembly to provide a video screen that is viewable by the driver of the vehicle, such as a video display screen of the type described in PCT Application No. PCT/US03/40611, filed Dec. 19, 2003 by Donnelly Corporation for ACCESSORY SYSTEM FOR VEHICLE, published Jul. 15, 2004 as PCT Publication No. WO 2004/ 058540, which is hereby incorporated herein by reference. The video display screen may be operable to display information to the driver of the vehicle, and may be incorporated into or may be in communication with a vision system or imaging system of the vehicle, such as a rearwardly directed vehicle vision system utilizing principles disclosed in U.S. Pat. Nos. 5,550,677; 5,760,962; 5,670,935; 6,201,642; 6,717, 610; and/or 6,757,109, which are hereby incorporated herein by reference, a trailer hitching aid or tow check system, such as the type disclosed in U.S. patent application Ser. No. 10/418,486, filed Apr. 18, 2003 by McMahon et al. for VEHICLE IMAGING SYSTEM, now U.S. Pat. No. 7,005, 974, which is hereby incorporated herein by reference, a cabin viewing device or system, such as a baby viewing or rear seat viewing camera or device or system or the like, such as disclosed in U.S. Pat. Nos. 5,877,897 and 6,690,268, which are hereby incorporated herein by reference, a video communication device or system, such as disclosed in U.S. Pat. No. 6,690,268, which is hereby incorporated herein by reference, and/or the like. Optionally, the video display screen may also or otherwise serve as a screen for a navigation system of the vehicle or the like, such as a GPS-based navigation system, such as is known in the automotive art.

Optionally, the mirror assembly may include or may be associated with a telematics system of the vehicle, such as an ONSTAR® system as found in General Motors vehicles or the like, and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; and/or 6,678,614; and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003 by Schofield for IMAGING SYSTEM FOR VEHICLE, now U.S. Pat. No. 6,946,978; and/or PCT Application No. PCT/US03/40611, filed Dec. 19, 2003 by Donnelly Corporation et al. for ACCESSORY SYSTEM FOR VEHICLE, published Jul. 15, 2004 as PCT Publication No. WO 2004/058540, and/or PCT Application No. PCT/ US03/308877, filed Oct. 1, 2003 by Donnelly Corp. for MICROPHONE SYSTEM FOR VEHICLE, published Apr. 15, 2004 as PCT Publication No. WO 2004/032568, which are all hereby incorporated herein by reference.

Optionally, an accessory module may be positioned at or near the interior rearview mirror assembly of the vehicle, and/or one or more of the accessories or circuitry of the accessory module may be associated with one or more accessories or controls of the interior rearview mirror assembly. The accessory module may comprise any type of accessory module or windshield electronics module or console, such as the types described in U.S. patent application Ser. No. 10/355, 454, filed Jan. 31, 2003 by Schofield et al. for VEHICLE ACCESSORY MODULE, now U.S. Pat. No. 6,824,281; and Ser. No. 10/456,599, filed Jun. 6, 2003 by Weller et al. for INTERIOR REARVIEW MIRROR SYSTEM WITH COMPASS, now U.S. Pat. Nos. 7,004,593; and/or 6,690,268; 6,250,148; 6,341,523; 6,593,565; and 6,326,613, and/or PCT Application No. PCT/US03/40611, filed Dec. 19, 2003 by Donnelly Corp. et al. for ACCESSORY SYSTEM FOR VEHICLE, published Jul. 15, 2004 as PCT Publication No. WO 2004/058540, which are all hereby incorporated herein by reference.

The connection or link between the controls and the other systems and accessories of the mirror assembly and/or accessory module and/or of the vehicle may be provided via vehicle electronic or communication systems and the like. For example, the accessories or components of the interior rearview mirror assembly may be connected to the vehicle electronic or communication systems and may be connected via various protocols or nodes, such as Bluetooth™, SCP, UBP, J1850, CAN J2284, Fire Wire 1394, MOST, LIN and/or the like, or other vehicle-based or in-vehicle communication links or systems (such as WIFI and/or IRDA) and/or the like, depending on the particular application of the interior rearview mirror assembly and/or compass pod or module of the present invention. Optionally, the connections or links may be provided via wireless connectivity or links, without affecting the scope of the present invention. The interior rearview mirror assembly and/or compass pod or module may be electronically integrated with the vehicle electrical and/or control systems. For example, the interior rearview mirror assembly may connect to a sunroof control, rain sensor control, mass motion sensor, roof lighting control, microphone/cell phone control, climate control, and/or the like.

Therefore, the interior rearview mirror assembly of the present invention provides for a direct support of the reflective element, attachment plate and printed circuit board and any accessories positioned thereon or associated therewith on the mounting assembly, such that the bezel and casing connection does not have to support and transfer the load of the reflective element and accessories. The interior rearview mirror assembly of the present invention thus may provide enhanced vibrational performance of the mirror assembly. This may be particularly beneficial and/or desirable for applications where one or more accessories, such as displays, lights, and/or the like, are included on the printed circuit board, because the additional accessories may add to the weight of the supported components, which may adversely affect the vibration performance of the mirror assembly. The attachment plate and mounting assembly and cam actuator of the present invention also facilitate enhanced assembly processing of the mirror assembly, such that the mounting assembly and cam actuator may be readily and efficiently attached to or mounted to the attachment plate to adjustably mount or attach the attachment plate and reflective element to the mounting assembly. The present invention also provides integration of the electronic components and circuitry and accessories into the circuit board and attachment plate. The present invention thus may provide an economical means for a mirror manufacturer to provide an electrochromic mirror or a prismatic mirror with a common design and components while meeting the desired electrical content of the mirror assemblies.

Changes and modification in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
   a reflective element, said reflective element comprising a prismatic reflective element, wherein said prismatic reflective element comprises a transflective mirror reflector;
   a display-on-demand display disposed behind said prismatic reflective element and operable to display information for viewing through said transflective mirror reflector of said prismatic reflective element by a driver of the vehicle when said interior rearview mirror assembly is normally mounted in the vehicle;
   a mounting assembly that is configured to mount said mirror assembly to an interior portion of the vehicle, said mounting assembly including a toggle portion and an actuator;
   an attachment plate secured to said reflective element;
   an electronic circuitry element attached to said attachment plate, said attachment plate including first and second mounting members;
   wherein a portion of said toggle portion pivotally engages said first mounting member and wherein said actuator pivotally engages said second mounting member;
   an accessory pod attached to said mounting assembly, wherein said accessory pod includes circuitry therein, said circuitry being electrically connected to said electronic circuitry element; and
   wherein said electronic circuitry element comprises a circuit board and wherein said circuit board comprises one of a substantially rigid circuit board and a flexible circuit board.

2. The interior rearview mirror assembly of claim 1, wherein said first mounting member comprises a pair of receiving members for pivotally receiving respective portions of said toggle portion.

3. The interior rearview mirror assembly of claim 1, wherein said actuator engages said mounting assembly.

4. The interior rearview mirror assembly of claim 3, wherein said actuator includes a receiving portion that receives a guide portion of said toggle portion.

5. The interior rearview mirror assembly of claim 1, wherein said accessory pod comprises a compass pod receiving compass circuitry therein.

6. The interior rearview mirror assembly of claim 1, wherein said accessory pod comprises a unitarily formed pod that receives said circuitry therein and closes to substantially retain said circuitry within said pod.

7. The interior rearview mirror assembly of claim 1, wherein said circuit board comprises a substantially rigid circuit board.

8. The interior rearview mirror assembly of claim 1, wherein said circuit board comprises a flexible circuit board.

9. The interior rearview mirror assembly of claim 1, wherein said electronic circuitry element comprises a printed circuit board.

10. An interior rearview mirror assembly for a vehicle, said interior rearview mirror assembly comprising:
    a reflective element, said reflective element comprising a prismatic reflective element, wherein said prismatic reflective element comprises a transflective mirror reflector;
    a display-on-demand display disposed behind said prismatic reflective element and operable to display information for viewing through said transflective mirror reflector of said prismatic reflective element by a driver of the vehicle when said interior rearview mirror assembly is normally mounted in the vehicle;
    a mounting assembly that is configured to mount said mirror assembly to an interior portion of the vehicle, said mounting assembly including a toggle portion and an actuator;
    an attachment plate secured to said reflective element;

an electronic circuitry element attached to said attachment plate, said attachment plate including first and second mounting members;

wherein a portion of said toggle portion pivotally engages said first mounting member;

an accessory pod attached to said mounting assembly, wherein said accessory pod comprises a unitarily formed pod that receives circuitry therein and closes to substantially retain said circuitry within said pod, said circuitry being electrically connected to said electronic circuitry element; and wherein said electronic circuitry element comprises a printed circuit board.

11. The interior rearview mirror assembly of claim 10, wherein said first mounting member comprises a pair of receiving members for pivotally receiving respective portions of said toggle portion.

12. The interior rearview mirror assembly of claim 10, wherein said actuator pivotally engages said second mounting member.

13. The interior rearview mirror assembly of claim 12, wherein said actuator engages said mounting assembly.

14. The interior rearview mirror assembly of claim 13, wherein said actuator includes a receiving portion that receives a guide portion of said toggle portion.

15. The interior rearview mirror assembly of claim 10, wherein said accessory pod comprises a compass pod receiving compass circuitry therein, 16. An interior rearview mirror assembly for a vehicle, said interior rearview mirror assembly comprising:

a reflective element, said reflective element comprising a prismatic reflective element, wherein said prismatic reflective element comprises a transflective mirror reflector;

a display-on-demand display disposed behind said prismatic reflective element and operable to display information for viewing through said transflective mirror reflector of said prismatic reflective element by a driver of the vehicle when said interior rearview mirror assembly is normally mounted in the vehicle;

a mounting assembly that is configured to mount said mirror assembly to an interior portion of the vehicle, said mounting assembly including a toggle portion and an actuator;

an attachment plate secured to said reflective element;

an electronic circuitry element attached to said attachment plate, said attachment plate including first and second mounting members;

wherein a portion of said toggle portion pivotally engages said first mounting member, and wherein said first mounting member comprises a pair of receiving members for pivotally receiving respective portions of said toggle portion;

a compass pod attached to said mounting assembly, wherein said compass pod comprises a unitarily formed pod that receives compass circuitry therein and closes to substantially retain said compass circuitry within said compass pod, said compass circuitry being electrically connected to said electronic circuitry element; and wherein said electronic circuitry element comprises a circuit board and wherein said circuit board comprises one of a substantially rigid circuit board and a flexible circuit board.

17. The interior rearview mirror assembly of claim 16, wherein said actuator pivotally engages said second mounting member.

18. The interior rearview mirror assembly of claim 17, wherein said actuator engages said mounting assembly.

19. The interior rearview mirror assembly of claim 18, wherein said actuator includes a receiving portion that receives a guide portion of said toggle portion.

* * * * *

UNITED STATES PATENT AND TRADEMARK OFFICE
CERTIFICATE OF CORRECTION

PATENT NO.        : 8,246,183 B2
APPLICATION NO.   : 13/162216
DATED             : August 21, 2012
INVENTOR(S)       : Jerry M. Kulas It is certified that error appears in the above-identified patent and that said Letters Patent is hereby corrected as shown below:

Column 1
Line 13, "No," should be --No.--
Line 35, "position;" should be --position,--
Line 37, "minor" should be --mirror--
Line 46, "minor" should be --mirror--

Column 2
Line 64, "minor" should be --mirror--

Column 4
Lines 35-36, "industry," should be --industry.--

Column 12
Line 41, "arc" should be --are--

Column 15
Line 56, "minor" should be --mirror--

Column 16
Line 14, "minor" should be --mirror--
Line 16, "minors" should be --mirrors--

Column 19
Line 62, "Pat," should be --Pat.--

Column 20
Line 45, "minor" should be --mirror--

Signed and Sealed this
Eighteenth Day of December, 2012

David J. Kappos
*Director of the United States Patent and Trademark Office*

Column 25
Line 28, Claim 15, "therein," should be --therein.--